US011236916B2

(12) United States Patent
Gray et al.

(10) Patent No.: US 11,236,916 B2
(45) Date of Patent: Feb. 1, 2022

(54) SYSTEMS AND METHODS FOR MANAGING BUILDING SIGNATURE INTELLIGENT ELECTRONIC DEVICES

(71) Applicant: Schneider Electric USA, Inc., Andover, MA (US)

(72) Inventors: Anthony R. Gray, Victoria (CA); Jeffrey W. Yeo, Saanichton (CA); Johannes Menzel, Saint Hilaire Du Touvet (FR)

(73) Assignee: Schneider Electric USA, Inc., Boston, MA (US)

(*) Notice: Subject to any disclaimer, the term of this patent is extended or adjusted under 35 U.S.C. 154(b) by 59 days.

(21) Appl. No.: 16/629,478

(22) PCT Filed: Apr. 19, 2018

(86) PCT No.: PCT/US2018/028264
§ 371 (c)(1),
(2) Date: Jan. 8, 2020

(87) PCT Pub. No.: WO2018/195251
PCT Pub. Date: Oct. 25, 2018

(65) Prior Publication Data
US 2020/0200415 A1 Jun. 25, 2020

Related U.S. Application Data

(60) Provisional application No. 62/487,651, filed on Apr. 20, 2017.

(51) Int. Cl.
*F24F 11/30* (2018.01)
*G05B 17/02* (2006.01)
(Continued)

(52) U.S. Cl.
CPC ............. *F24F 11/30* (2018.01); *F24F 11/64* (2018.01); *F24F 11/65* (2018.01); *G05B 17/02* (2013.01);
(Continued)

(58) Field of Classification Search
CPC .. F24F 11/30; F24F 11/64; F24F 11/65; F24F 2110/20; F24F 2140/60; F24F 2140/50;
(Continued)

(56) References Cited

U.S. PATENT DOCUMENTS 7,188,003 B2 * 3/2007 Ransom .................. H04L 63/20
700/286
9,020,769 B2 * 4/2015 Rada ........................ G01D 4/00
702/60

(Continued)

OTHER PUBLICATIONS

PCT International Search Report for International Patent Application No. PCT/US2018/028264, dated Aug. 24, 2018, 2 pages.
(Continued)

Primary Examiner — Ramesh B Patel
(74) Attorney, Agent, or Firm — Locke Lord LLP; Peter N. Fill; Judy R. Naamat

(57) ABSTRACT

A method for evaluating a building signature operational model (BSOM) associated with a building signature intelligent electronic device (BSIED) includes processing building signature operational data (BSOD) on a cloud-connected central processing unit to identify the BSIED from which the BSOD was received, and to determine if a current BSOM associated with the BSIED, and used by the BSIED to generate the BSOD, needs to be updated. In response to determining that the current BSOM needs to be updated, a new BSOM is selected for the BSIED from a BSOM library based, at least in part, on one or more characteristics
(Continued)

associated with the BSIED. The new BSOM is transmitted to the BSIED for installation on the BSIED.

27 Claims, 11 Drawing Sheets

(51) Int. Cl.
  | | |
  |---|---|
  | *G06Q 10/06* | (2012.01) |
  | *G06Q 50/06* | (2012.01) |
  | *G06Q 50/16* | (2012.01) |
  | *F24F 11/64* | (2018.01) |
  | *F24F 11/65* | (2018.01) |
  | *F24F 110/20* | (2018.01) |
  | *F24F 140/60* | (2018.01) |
  | *F24F 140/50* | (2018.01) |
  | *F24F 120/12* | (2018.01) |
  | *F24F 110/10* | (2018.01) |

(52) U.S. Cl.
  CPC ......... *G06Q 10/0637* (2013.01); *G06Q 50/06* (2013.01); *G06Q 50/163* (2013.01); *F24F 2110/10* (2018.01); *F24F 2110/20* (2018.01); *F24F 2120/12* (2018.01); *F24F 2140/50* (2018.01); *F24F 2140/60* (2018.01)

(58) Field of Classification Search
  CPC ... F24F 2120/12; F24F 2110/10; G05B 17/02; G06Q 10/0637; G06Q 50/06; G06Q 50/163; G06Q 10/06
  See application file for complete search history.

(56) References Cited

U.S. PATENT DOCUMENTS

| | | | | |
|---|---|---|---|---|
| 9,425,978 B2* | 8/2016 | Frei | .................. | H04L 67/289 |
| 2004/0225649 A1* | 11/2004 | Yeo | .................. | G01D 4/004 |
| 2009/0289809 A1* | 11/2009 | Gray | .................. | G01D 4/002 |
| | | | | 340/870.11 |
| 2011/0251807 A1* | 10/2011 | Rada | .................. | G01D 4/00 |
| | | | | 702/61 |
| 2013/0151179 A1* | 6/2013 | Gray | .................. | H02J 13/0006 |
| | | | | 702/62 |
| 2013/0151212 A1* | 6/2013 | Gray | .................. | G06Q 50/06 |
| | | | | 703/2 |
| 2013/0173322 A1* | 7/2013 | Gray | .................. | H02J 13/00017 |
| | | | | 705/7.13 |
| 2014/0005809 A1* | 1/2014 | Frei | .................. | H04L 43/10 |
| | | | | 700/90 |
| 2015/0362537 A1* | 12/2015 | Van Gorp | .................. | G01R 21/00 |
| | | | | 702/60 |

OTHER PUBLICATIONS

PCT Written Opinion of the International Searching Authority for International Patent Application No. PCT/US2018/028264, dated Aug. 24, 2018, 6 pages.

* cited by examiner

SYSTEMS AND METHODS FOR MANAGING BUILDING SIGNATURE INTELLIGENT ELECTRONIC DEVICES

BACKGROUND

Monitoring and control devices are used in a wide variety of installations, such as industrial facilities, warehouses, office buildings or other commercial complexes, data centers, power distribution networks, and the like. These devices monitor conditions in the installation, such as temperature, power usage, power quality, etc., and provide indications of the monitored parameters that can be used to control conditions within the installation. Examples of monitoring and control devices include smart utility meters, power quality meters, and other embedded systems. The software for monitoring and control devices typically includes low-level firmware containing various operation and control functions. For example, firmware may enable integration or communication between hardware components that are not otherwise able to communicate. Firmware typically requires significant testing and device-specific expertise to be developed and deployed effectively. Installing new firmware on a monitoring and control device often necessitates that the device be shut down or disabled throughout the installation process. Installing new firmware may further require a device-specific expert to be deployed on site and manually perform some or all of the installation process. Installing new firmware may also incur the risk of introducing undetected software errors that could impact the operation of the device in unanticipated ways.

SUMMARY

Described herein are systems and methods related to building signature intelligent electronic devices (BSIEDs) and building signature systems including BSIEDs. More particularly, in one aspect, a method for evaluating a building signature operational model (BSOM) associated with a BSIED includes: receiving building signature input data (BSID) from one or more building signature data sources (BSDSs) at an input of the BSIED, and processing the received BSID using a current BSOM stored on a memory device of the BSIED to generate building signature operational data (BSOD). In embodiments, the BSOD corresponds to a quantity predicted by the BSOM, for example, building energy consumption.

The method also includes: transmitting the BSOD to a cloud-connected central processing unit communicatively coupled to the at least one BSIED, processing the BSOD on the cloud-connected central processing unit to identify the BSIED, and processing the BSOD to determine if the current BSOM associated with the BSIED needs to be updated. In response to determining that the current BSOM needs to be updated, a new BSOM is selected for the BSIED based, at least in part, on one or more characteristics associated with the BSIED. The new BSOM is transmitted to the BSIED for installation on the BSIED. The BSOM, which is one example type of operational model, may be used, for example, to monitor and predict energy consumption of a building in which the BSIED is installed. More particularly, the BSIED may be coupled to receive BSID at BSIED inputs and, using the BSOM, the BSIED may be configured to generate BSOD indicative of building energy consumption at an output thereof. In embodiments, the BSID may include production activity data (e.g., from equipment in the building), weather data, occupancy data, and other driver data that may be suitable for use with the BSOM (which is device and building specific), as will be described in greater detail below.

In some embodiments, the term "building signature" as used herein refers to building energy consumption signature. Additionally, in some embodiments the term "signature" as used herein refers to the response function of energy consumption in a building to various input (or "driver") variables that influence energy consumption.

The method for evaluating the BSOM associated with the BSIED may include one or more of the following features either individually or in combination with other features. The method may further include validating that the new BSOM was correctly transmitted to the BSIED. The method may further include processing BSID (e.g., on the cloud, or on the BSIED) using the new BSOM to generate BSOD associated with the new BSOM, and evaluating accuracy of the BSOD to confirm that the new BSOM is operating as expected. The BSID may be received from one or more BSDSs at an input of the BSIED. The BSOD may be generated at an output of the BSIED. The BSDSs may include equipment to which the BSIED is coupled. The BSID may include energy usage information associated with the BSDSs. The BSID may correspond to test BSID (e.g., historical BSID) for validating accuracy of the BSOM. In some embodiments, the test BSID may be retrieved from a memory device of the BSIED. Additionally, in some embodiments the test BSID may be retrieved from a memory device associated with the cloud-connected central processing unit.

Processing BSOD on a cloud-connected central processing unit to identify the BSIED from which the BSOD was received from, and to determine if a current BSOM associated with the BSIED needs to be updated, may include determining if a predetermined time period or other predetermined condition has occurred since the current BSOM has last been updated or verified. In response to determining that the predetermined time period or other predetermined condition has occurred, a request signal may be submitted to the BSIED for retrieving BSOD from the BSIED. In response to receiving the request signal, the BSIED may transmit BSOD to the cloud-connected central processing unit. The cloud-connected central processing unit may process the BSOD to identify the BSIED from which the BSOD was received from, and to determine if a current BSOM associated with the BSIED needs to be updated.

Processing BSOD on a cloud-connected central processing unit to determine if a current BSOM associated with the BSIED needs to be updated may include: comparing a version number of an algorithm used to generate the current BSOM with a version number of a latest model generating algorithm, and determining that the current BSOM needs to be updated if the version number of the algorithm used to generate the current BSOM is substantially different from the version number of the latest model generating algorithm (e.g., by more than few versions).

Selecting a new BSOM for the BSIED may include generating a new BSOM for the BSIED based, at least in part, on the BSOD and one or more characteristics associated with the BSIED. Selecting the new BSOM for the BSIED may include selecting a closest BSOM for the BSIED from a BSOM library based, at least in part, on one or more characteristics associated with the BSIED. Selecting the new BSOM for the BSIED may also include determining if the closest BSOM needs to be translated or otherwise modified to work with the BSIED. In response to determining that the closest BSOM needs to be translated or otherwise modified to work with the BSIED, the closest BSOM may be translated into a form the BSIED supports. The translated BSOM may be selected as the new BSOM for the BSIED.

The BSOM library may be stored on a memory device associated with the cloud-connected central processing unit. The BSOM library may include a plurality of BSOMs. The plurality of BSOMs may be generated by the cloud-connected central processing unit in response to receiving input data from one or more respective data sources associated with the BSIEDs for which the plurality of BSOMs are intended. The data sources may include at least one of a temperature sensor, a humidity sensor, and an occupancy sensor configured to generate respective temperature, humidity and occupancy input data pertaining to the environment(s) in which the BSIEDs are installed.

The characteristics associated with the BSIED in selecting the new BSOM for the BSIED may include BSIED type, BSIED complexity, and/or building signature parameters monitored by the BSIED. The BSIED type may include at least one of an energy meter, a power quality monitor, a waveform monitor, a programmable sensing device, a measurement and verification device, an uninterruptible power supply, a power quality correction device, and a harmonic filter with metering capabilities. The building signature parameters monitored by the BSIED may include one or more energy consumption parameters. Typical energy consumption parameters, or "drivers," include, but are not limited to: outdoor weather temperature, number of occupants on a given day, production activity metrics specific to the activity (or activities) in the building (e.g., units manufactured in a manufacturing business), hours of sunlight per day, wind speed, and relative humidity.

The BSOD generated by the BSIED using the BSOM may be indicative of an estimated energy consumption of a building in which the BSIED may be installed. The BSIED complexity may be selected from "basic", "intermediate", and "advanced". An intermediate complexity BSIED may have more functionality than a basic complexity BSIED. An advanced complexity BSIED may have more functionality than the intermediate complexity BSIED. The intermediate complexity BSIED may be responsive to more building signature data sources than the basic complexity BSIED. The advanced complexity BSIED may be responsive to more building signature data sources and may support more complex BSOM calculations than the intermediate complexity BSIED.

The method may further include subsequent to selecting the new BSOM for the BSIED, determining if the current BSOM is capable of being updated to the new BSOM. In response to determining that the current BSOM is capable of being updated to the new BSOM, parameters to be added to, removed from and/or modified in the current BSOM may be identified to update the current BSOM to the new BSOM. The current BSOM may be to the new BSOM based on the identified parameters.

Updating the current BSOM to the new BSOM may include generating the parameters identified to be added to and/or modified in the current BSOM. Transmitting the new BSOM to the BSIED may include: (a) transmitting the generated parameters to the BSIED, (b) providing an indication of which parameters, if any, should be removed from the current BSOM to the BSIED, and (c) updating the current BSOM to the new BSOM on the BSIED based on the generated parameters and the provided indication.

The method may further include tuning the new BSOM in response to user input, for example, received from a user input device. In some embodiments, the new BSOM is tuned on the BSIED. In other embodiments, the new BSOM is tuned on the cloud-connected central processing unit.

In embodiments, a building signature system is also provided herein. The building signature system includes at least one building signature intelligent electronic device (BSIED) comprising a memory device and a processor coupled to the memory device. The processor and the memory device are configured to receive building signature input data (BSID) from one or more building signature data sources (BSDSs). The processor and the memory device are also configured to process the received BSID using a current building signature operational model (BSOM) stored on the memory device to generate building signature operational data (BSOD). The processor and the memory device are further configured to transmit the BSOD to a cloud-connected central processing unit communicatively coupled to the at least one BSIED.

The cloud-connected central processing unit is configured to process the BSOD to identify the at least one BSIED from which the BSOD was received from, and to determine if the current BSOM associated with the at least one BSIED needs to be updated. In response to determining that the current BSOM needs to be updated, a new BSOM for the at least one BSIED may be selected based, at least in part, on one or more characteristics associated with the at least one BSIED. In embodiments, the new BSOM is selected from a BSOM library. The new BSOM may be transmitted to the at least one BSIED for installation on the at least one BSIED. In embodiments, the BSDSs may include equipment to which the at least one BSIED is coupled, and the BSID comprises energy usage information associated with the BSDSs. Additionally, in embodiments the BSOD may be indicative of an estimated energy consumption of a building in which the at least one BSIED is installed.

Aspects and embodiments provide BSIEDs capable of executing applications-level software programs ("applications"), and methods for dynamically and automatically reprogramming these devices without requiring manual firmware updates.

Certain applications executed on a BSIED involve gathering external data, controlling one or more external devices, or performing analytics on the fly or on internally-stored data. For monitoring and control devices, gathering external data may include monitoring one or more parameters associated with an installation in which the BSIED is located. The building signature operational model BSOM of a BSIED may include one or more applications, and may be improved by updating the BSIED with new application instruction sets and/or new data parameters to be referenced by those instruction sets. However, updating the applications on a BSIED has conventionally involved deploying an expert to manually update the entire device firmware, and is therefore costly in terms of both time and money. Accordingly, aspects and embodiments are directed to methods and apparatus for automatically generating improved BSOMs for BSIEDs and automatically updating those BSIEDs with the new BSOMs, without requiring burdensome firmware updates.

In embodiments, each BSOM is compatible with certain BSIEDs and includes one or more applications, software instructions, algorithms, functions, or software parameters, which may be arranged in one or more hierarchies. The BSIEDs may be configured to gather and transmit operational data to one or more cloud-connected central processing units. The cloud connected central-processing units may execute cloud analytic models configured to analyze operational data, for example using regression analysis. Cloud analytic models may also involve accessing and analyzing one or more sources of stored or external data. Cloud analytic models may further be configured to develop new BSOMs based on the analysis and transmit the new BSOMs to compatible BSIEDs. Compatible BSIEDs may be able to install the new BSOMs without requiring a firmware upgrade or, for example, without requiring downtime or manual human interaction.

According to one embodiment, there is provided a system for generating a new BSOM for BSIED and reprogramming the BSIED to execute the new BSOM. The system may comprise a first BSIED including a BSIED processor configured to execute instructions corresponding to a BSOM, collect data, and encode the data, a BSIED memory containing the BSOM including a set of application instructions and a set of application parameters, and configured to store the encoded data, a BSIED communications module communicatively coupled to a cloud and configured to send the encoded data to the cloud. The system may further comprise a cloud computer system including a cloud communications module communicatively coupled to the cloud, and a cloud processor configured to receive identification information of the first BSIED via the cloud communications module, receive the encoded data from the first BSIED via the cloud communications module, select a cloud analytic model responsive to receiving the identification information from the first BSIED, decode the encoded data into decoded data via the cloud analytic model, analyze the decoded data via the cloud analytic model, and generate, responsive to analyzing the decoded data via the cloud analytic model, an application-based BSOM.

In one example the cloud processor is further configured to transmit the application-based BSOM to the first BSIED via the cloud communications module. The cloud processor may be further configured to transmit the application-based BSOM to a second BSIED via the cloud communications module, wherein the second BSIED shares at least one of a model, type, location, owner, operator, hardware configuration, or software configuration with the first BSIED. The data collected by the first and/or second BSIED may include values of at least one environmental parameter sensed by at least one a sensor of the BSIED.

Various embodiments herein describe methods for reprogramming a BSIED to execute a BSOM. The method may include transmitting, via a communications module coupled to a processor of the BSIED, operational data from the BSIED to a cloud-connected central processing unit; analyzing the operational data using a cloud analytic model executed by the central processing unit; responsive to the analyzing, generating the BSOM; receiving at the BSIED, via the communications module, the BSOM from the central processing unit; and responsive to receiving the BSOM at the BSIED, installing the BSOM on the BSIED and reprogramming the BSIED to execute the BSOM.

In various embodiments of the method for reprogramming, the BSIED may include one or more of an energy meter, a power quality monitor, a waveform monitor, a programmable sensing device, an uninterruptible power supply, a power quality correction device, or a harmonic filter with metering capabilities. The method may further include receiving at the central processing unit at least one external data set, wherein analyzing the operational data includes analyzing the at least one external data set. The at least one external data set includes at least one of weather data and utility pricing data. In certain embodiments of the method, analyzing an operational data set may include performing a regression analysis, or other recursive or iterative analysis. Reprogramming a BSIED to execute the BSOM may include modifying at least one application stored on a BSIED memory coupled to the processor of the BSIED. Reprogramming the BSIED to execute the BSOM may also include modifying at least one application instruction or at least one application parameter stored on a BSIED memory coupled to the processor of the BSIED.

Other embodiments described herein describe a method for generating a new BSOM for a BSIED. The method may include receiving at a cloud-connected central processing unit, via a communications module coupled to the cloud-connected central processing unit, at least one encoded data set generated by a first BSIED pursuant to an existing BSOM executing on the first BSIED; receiving at the cloud-connected central processing unit, via the communications module, identification information associated with the first BSIED; decoding with the cloud-connected central processing unit the at least one encoded data set to produce a corresponding at least one decoded data set; selecting with the cloud-connected central processing unit a cloud analytic model associated with the first BSIED responsive to receiving the identification information associated with the first BSIED; analyzing, via the cloud analytic model, the at least one decoded data set; and generating, responsive to analyzing the at least one decoded data set, the new BSOM.

The method for generating may include receiving the identification information includes receiving at least one of a type of the first BSIED, a unique identifier of the first BSIED, an identity of an owner or operator of the first BSIED, a location of the first BSIED, a hardware configuration of the first BSIED, and a software configuration of the first BSIED. The method may also include transmitting the new BSOM from the cloud-connected central processing unit to the first BSIED. The method may further include receiving at the cloud-connected central processing unit, via the communications module, additional identification information associated with a second BSIED; and determining whether the second BSIED is associated with the cloud analytic model responsive to the additional identification information. In various additional embodiments, the method includes, responsive to determining that the second BSIED is associated with the cloud analytic model, generating the new BSOM includes generating the new BSOM capable of executing on the second BSIED, and further including transmitting the new BSOM from the cloud-connected central processing unit to the second BSIED. The method may further comprise storing, via a memory module coupled to the cloud-connected central processing unit, the at least one encoded data set. In some embodiments, the method also includes receiving at the cloud-connected central processing unit additional data from a cloud-connected data source, wherein generating the new BSOM includes generating the new BSOM responsive to analyzing the at least one decoded data set and the additional data.

Further embodiments herein describe a system for generating a new BSOM for BSIED comprising: the BSIED including a processor, a communications module, and a memory, the BSIED configured to produce operational data; and a cloud-connected central processing unit coupled to the BSIED via the communications module and a cloud network, the central processing unit configured to receive the operational data from the BSIED via the communications module, to analyze the operational data according to a cloud analytic model, and to generate the new operational model based on analyzing the operational data, the central processing unit being further configured to automatically transmit the new BSOM to the BSIED via the communications module, and the BSIED being further configured to automatically install and execute the new BSOM received from the central processing unit using the memory and the processor. The BSIED may include one or more of an energy meter, a power quality monitor, a waveform monitor, a programmable sensing device, an uninterruptible power supply, a power quality correction device, and a harmonic filter with metering capabilities. The central processing unit may be further configured to receive from the BSIED identification information associated with the BSIED and to select the cloud analytic model based on the identification information. The BSIED identification information may include at least one of a type of the first BSIED, a unique identifier of the first BSIED, an identity of owner or operator of the first BSIED, a location of the first BSIED, a hardware configuration of the first BSIED, and a software configuration of the first BSIED.

In various addition embodiments of the system, the BSOD produced by the BSIED includes an encoded data set, and the central processing unit of the system may be configured to receive and decode the encoded data set. The central processing unit may further be configured to receive at least one additional data set from a cloud-connected source, to analyze the at least one additional data set according to the cloud analytic model, and to generate the new BSOM based on analyzing both the BSOD and the at least one additional data set. The at least one additional data set may include at least one of weather data and utility pricing data. The central processing unit may also be configured to perform a regression analysis on the BSOD.

These exemplary aspects, examples, and embodiments are discussed in detail below, along with other aspects, examples, embodiments, and advantages. Examples and embodiments disclosed herein may be combined with other examples or embodiments in any manner consistent with at least one of the principles disclosed herein, and references to "an example," "some examples," "an alternate example," "various examples," "one example", "implementations", "embodiments", or the like are not necessarily mutually exclusive and are intended to indicate that a particular feature, structure, or characteristic described may be included in one or more examples or implementations. The appearances of such terms herein are not necessarily all referring to the same example or implementation. Various aspects, examples described herein may include means for performing any of the described methods or functions.

BRIEF DESCRIPTION OF THE DRAWINGS

The foregoing features of the disclosure, as well as the disclosure itself may be more fully understood from the following description of the drawings, in which.

DETAILED DESCRIPTION

Figure 1:
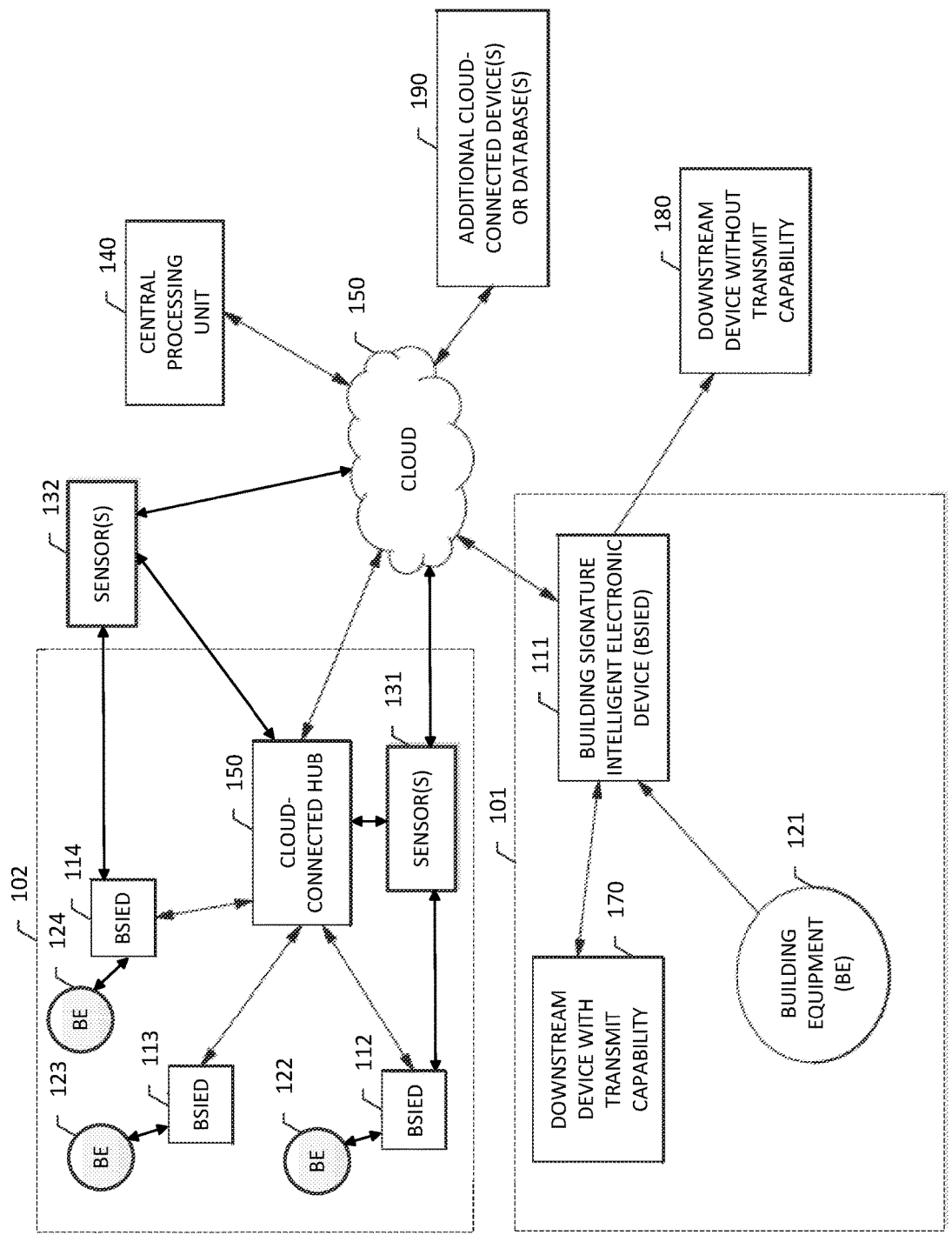
FIG. 1 is a block diagram illustrating an example building signature system in accordance with embodiments of the disclosure.

There are many circumstances in which it is desirable to monitor certain parameters, and to track patterns of such parameters. For example, it can be desirable to monitor energy usage parameters within an installation, and to track patterns of the energy usage over time. According to certain aspects and embodiments, tracking patterns of one or more parameters (for example energy parameters) and taking some action based on detected patterns (e.g., providing a control signal to an external device or providing an alert) can be accomplished directly within a monitoring and control device or by sending data to a central processing unit connected to the device. Conventional monitoring and control devices can be used for simple energy (or other) parameter tracking and providing responsive alerts. However, the capabilities of conventional monitoring and control devices are generally limited to detecting and reacting to patterns of monitored parameters. Although fixed or relative set-points can be established in conventional devices and used to provide alerts when the set-points are exceeded, for example, the configuration of these set-points typically must be configured manually for each device. This manual reconfiguration can be time-consuming and expensive, particularly if the set-point configurations are part of the device firmware.

Aspects and embodiments provide a dynamic monitoring and control methodology that leverages enhanced computing capability of servers or other computing devices that can be connected to a target monitoring and control device, along with an ability to provide application-level (rather than firmware-level) programming to the target device and to dynamically update the programming based on monitored parameters or external data. As discussed in more detail below, certain aspects and embodiments are directed to automatic creation of application-level programs for building signature intelligent electronic devices (BSIEDs), including certain monitoring and control devices; the programs being configured to detect a pattern of interest in one or more monitored parameters based on analysis that can be performed by a central processing unit connected to the intelligent electronic device. Each program can be configured to match the capabilities of the target intelligent electronic device, as discussed further below. In addition, aspects and embodiments provide for automatic delivery of a generated program to the target device, and dynamic updating or reconfiguration of the program based on continuing analysis of data collected by the target device. An updated BSIED may also execute instructions that utilize existing data previously stored on the device prior to the update.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

A BSIED is a computational electronic device optimized to perform a particular function or set of functions. As discussed above, examples of BSIEDs include monitoring and control devices, such as, but not limited to, energy parameter monitoring devices. BSIEDs may be used to perform monitoring and control functions in a wide variety of installations. The installations may include industrial facilities, warehouses, office buildings or other commercial complexes, computing co-location centers, data centers, power distribution networks, and the like. For example, where the BSIED is an electrical power monitoring device, it may be coupled to an electrical power distribution system and configured to sense and store data representing operating characteristics (e.g., voltage, current, waveform distortion, power, etc.) of the power distribution system. These characteristics may be analyzed by a user to evaluate potential performance or power quality-related issues. The BSIED may include a controller (which in certain BSIEDs can be configured to run one or more applications), firmware, a memory, a communications interface, and connectors that connect the BSIED to external systems or devices. At least certain aspects of the monitoring and control functionality of a BSIED may be embodied in a computer program that is accessible by the BSIED.

Certain BSIEDs possess sufficient resources to execute higher-level software applications built atop the firmware and enabling the BSIED to perform more generalized or advanced functions. Firmware is relatively low-level software designed to permit one or more hardware components in a BSIED to communicate with each other and to permit higher-level application software to be executable on one or more hardware components such as processors. The firmware generally includes machine instructions for directing the controller of the BSIED to carry out operations required for the BSIED. In contrast, applications are higher-level software that typically rely upon firmware in order to be executable on a particular device. Applications comprise bundles of software instructions stored in memory that use and access one or more data parameters also stored in memory. Applications may be written in a different programming language than that used for firmware programming, thus requiring intermediate software such as compilers or assemblers to translate between application instructions and firmware instructions and vice versa. As discussed above, updating BSIED firmware is considered a "heavy" process for a number of reasons. First, the installation of new firmware often requires the device being updated to be powered off or otherwise disabled throughout the update process. Second, all or part of a BSIED firmware installation must often be performed manually. For example, a human installer may be required to interact with one or more physical buttons or interfaces on the BSIED throughout the installation process. The installer may further be required to connect one or more sources of external media to the BSIED in order to transfer one or more files associated with the firmware update.

A BSIED can be configured to perform one or more monitoring, control, and/or analysis functions pursuant to its one or more associated building signature operational models (BSOMs). A BSEID could for example run one BSOM to predict energy consumption and simultaneously run a separate and independent BSOM to predict responses to power quality problems. As used herein, the term "building signature operational model" refers to a set of application instructions and/or application data parameters stored in the BSIED memory and configured to execute in a particular manner. The set of applications comprising a BSIED operational model can be configured to work together in order to implement one or more BSIED monitoring, control, and/or analysis functions. The execution of an operational model results in operational data being collected and/or generated in the BSIED's memory. This operational data may include measurement data corresponding to one or more monitored parameters, and/or other data. According to various embodiments, the operational model of a BSIED, including one or more applications, application instructions, and/or data parameters, may be updated or modified without needing to suspend or modify the firmware. In certain embodiments, other applications not associated with the applications being modified may continue to function. In some embodiments, updating of the building signature operational model can be performed automatically on the BSIED, without the need for a human being to be dispatched to the location of the BSIED or to manually interact with the device.

Examples of the BSIEDs can include, but are not limited to, smart power meters, PowerLogic ION series meters or Sepam Protection Relays, both of which are manufactured by Schneider Electric, measurement and verification devices, and/or other programmable electronic devices. Further examples of BSIED are discussed in connection with figures below.

In some embodiments, the term "BSIED" as used herein may refer to a hierarchy of BSIEDs operating in tandem. For example, a BSIED may correspond to a hierarchy of energy meters, power meters, or other types of resource meters. The hierarchy may comprise a tree-based hierarchy, such a binary tree, a tree having one or more child nodes descending from each parent node, or combinations thereof, wherein each node represents a specific BSIED. In some instances, the hierarchy of BSIEDs may share data or hardware resources and may execute shared software.

In some embodiments, the term "BSOM" as used herein may refer to a hierarchy of BSOMs executing in tandem. The hierarchy may comprise a tree-based hierarchy, such a binary tree, a tree having one or more child nodes descending from each parent node, or combinations thereof, wherein each node represents a specific function, algorithm, instruction, application, or parameter.

Referring to FIG. 1, an example building signature system in accordance with embodiments of the disclosure includes a plurality of building signature intelligent electronic devices (BSIEDs) 111, 112, 113, 114 capable of sensing or monitoring one or more building signature parameters (e.g., energy usage parameters) associated with buildings 101, 102 in which the BSIEDs 111, 112, 113, 114 are installed. In the example embodiment shown, BSIED 111 is installed in building 101. Additionally, in the example embodiment shown BSIEDs 112, 113, 114 are installed in building 102. In embodiments, any number of BSIEDs may be installed in each of the buildings 101, 102. The buildings 101, 102 may correspond, for example, to commercial, industrial or institutional buildings.

As shown in FIG. 1, the building signature system also includes a plurality of sensors 131, 132 that may be used in connection with the BSIEDs 111, 112, 113, 114, for example, to increase the accuracy of outputs signals (e.g., building signature operational data (BSOD)) generated by the BSIEDs 111, 112, 113, 114, as will be discussed further below. Each of the BSIEDs 111, 112, 113, 114 has one or more associated building signature operational models (BSOMs) that by the BSIEDs 111, 112, 113, 114 to generate BSIED output signals, specifically BSOD. The BSOMs may, for example, be used to predict the consumption of the buildings in which the BSIEDs 111, 112, 113, 114 are installed (here, buildings 101, 102) building given one or more associated building signature inputs (e.g., environmental inputs, such as weather, occupancy, and production activity).

In embodiments, sensor 131 may correspond to a local sensor that is installed in building 102. Additionally, in embodiments sensor 132 may correspond to a local sensor that is installed proximate to (e.g., within a predetermined distance of) building 102, or a sensor that is remote to the building 102. The sensors 131, 132 may include, for example, temperature sensors, humidity sensors, occupancy sensors or substantially any other type of sensor as may be suitable for use in the system, for example, depending on the application (e.g., energy usage monitoring). Other sensors might include mass or fluid flow sensors associated with an industrial process, proximity sensors for material handling or any other sensor that indicates activity in an energy consuming process. In embodiments, any number (and type) of sensors may be used in connection with the building signature system.

In embodiments, sensor 131 may, for example, correspond to a temperature sensor configured to measure indoor air temperature at building 102. Additionally, in embodiments sensor 132 may, for example, correspond to a temperature sensor configured to measure outdoor air temperature at building 102.

In the example embodiment shown, the BSIEDs 111, 112, 113, 114 are each coupled to respective building equipment (121, 122, 123, 124) in the buildings 101, 102 in which the BSIEDs 111, 112, 113, 114 are installed. The building equipment 121, 122, 123, 124 may include, for example, machinery associated with a particular application (e.g., an industrial application) associated with the buildings 101, 102.

In embodiments, the BSIEDs 111, 112, 113, 114 may monitor and, in some embodiments, analyze building signature parameters associated with the building equipment 121, 122, 123, 124 to which they are coupled. The BSIEDs 111, 112, 113, 114 may also be embedded within the building equipment 121, 122, 123, 124 in some embodiments. According to various aspects, one or more of the BSIEDs 111, 112, 113, 114 may be configured to monitor utility feeds, including surge protectors, trip units, and transformers, which are some examples of building equipment 121, 122, 123, 124, and the BSIEDs 111, 112, 113, 114 can detect ground faults, voltage sags, voltage swells, momentary interruptions and oscillatory transients, as well as fan failure, temperature, and harmonic distortions, which are some example building signature parameters associated with the equipment. The BSIEDs 111, 112, 113, 114 may also monitor devices, such as generators, including outputs, protective relays, battery chargers, and sensors (for example, water, and fuel sensors). According to another aspect, the BSIEDs 111, 112, 113, 114 can detect generator conditions including reverse power, temperature, overvoltage and undervoltage conditions, as well as other parameters such as temperature, including ambient temperature. A wide variety of other monitoring and/or control functions can be performed by the BSIEDs 111, 112, 113, 114, and the aspects and embodiments disclosed herein are not limited to BSIEDs operating according to the above-mentioned examples.

As shown in FIG. 1, the BSIEDs 111, 112, 113, 114 and sensors 131, 132 are communicatively coupled to a central processing unit 140 via the "cloud" 150. In some embodiments, the BSIEDs 111, 112, 113, 114 and sensors 131, 132 may be directly communicatively coupled to the cloud 150, as BSIED 111 is in the illustrated embodiment. In other embodiments, the BSIEDs 111, 112, 113, 114 and sensors 131, 132 may be indirectly communicatively coupled to the cloud 150, for example, through an intermediate device, such as a cloud-connected hub 150, as BSIEDs 112, 113, 114 are in the illustrated embodiment. The cloud-connected hub 150 may, for example, provide the BSIEDs 112, 113, 114 with access to the cloud 150, the central processing unit 140 and other portions of the building signature system (e.g., sensors 121, 122, as will be discussed).

As used herein, the terms "cloud" and "cloud computing" are intended to refer to computing resources connected to the Internet or otherwise accessible to BSIEDs 111, 112, 113, 114 via a communication network, which may be a wired or wireless network, or a combination of both. The computing resources comprising the cloud 150 may be centralized in a single location, distributed throughout multiple locations, or a combination of both. A cloud computing system may divide computing tasks amongst multiple racks, blades, processors, cores, controllers, nodes or other computational units in accordance with a particular cloud system architecture or programming. Similarly, a cloud computing system may store instructions and computational information in a centralized memory or storage, or may distribute such information amongst multiple storage or memory components. The cloud system may store multiple copies of instructions and computational information in redundant storage units, such as a RAID array.

The central processing unit 140 may be an example of a cloud computing system, or cloud-connected computing system. In embodiments, the central processing unit 140 may be a server located within the buildings 101, 102 in which the BSIEDs 111, 112, 113, 114 are installed, or may be remotely-located cloud-based service. The central processing unit 140 may include computing functional components similar to those of the BSIEDs 111, 112, 113, 114 is some embodiments, but may generally possess greater numbers and/or more powerful versions of components involved in data processing, such as processors, memory, storage, interconnection mechanisms, etc. The central processing unit 140 can be configured to implement a variety of analysis techniques to identify patterns in received measurement data from the BSIEDs 111, 112, 113, 114, as discussed further below. The various analysis techniques discussed herein further involve the execution of one or more software functions, algorithms, instructions, applications, and parameters, which are stored on one or more sources of memory communicatively coupled to the central processing unit 140. In certain embodiments, the terms "function", "algorithm", "instruction", "application", or "parameter" may also refer to a hierarchy of functions, algorithms, instructions, applications, or parameters, respectively, operating in tandem. A hierarchy may comprise a tree-based hierarchy, such a binary tree, a tree having one or more child nodes descending from each parent node, or combinations thereof, wherein each node represents a specific function, algorithm, instruction, application, or parameter.

In addition, as also discussed in more detail below, the central processing unit 140 can be configured to generate updates or modifications to the building signature operational models of any of the BSIEDs 111, 112, 113, 114 and to provide the revised (or new) operational model(s) to the BSIED(s). Cloud-connectivity of the central processing unit 140 provides the ability to have one central processing unit 140 (or a coordinated group of central processing units) provide updated building signature operational models to multiple BSIEDs 111, 112, 113, 114 deployed at different physical locations (here, buildings 101, 102). In embodiments, since the central processing unit 140 is connected to the cloud 150, it may access additional cloud-connected devices or databases 190 via the cloud 150. For example, the central processing unit 140 may access the Internet and receive information such as weather data, utility pricing data, or other data that may be useful in analyzing the measurement data received from the BSIEDs 111, 112, 113, 114 and/or in reprogramming the building signature operational models of any of the BSIEDs 111, 112, 113, 114, as discussed further below.

In embodiments, the cloud-connected devices or databases 190 may correspond to a device or database associated with one or more external data sources. In embodiments, the external data sources may include weather data sources. For example, in embodiments the central processing unit 140 may be coupled to receive weather data (e.g., historical rainfall and temperature data) from the United States National Weather Service or another weather data source, and be configured to use the received weather data in generating a new or updated BSOM for the BSIEDs 111, 112, 113, 114, as will be discussed further in connection with figures below.

Additionally, in embodiments the cloud-connected devices or databases 190 may correspond to a user device from which a user may provide user input data. In embodiments, a user may view information about the BSIEDs 111, 112, 113, 114 (e.g., BSIED makes, models, types, etc.) and data collected by the BSIEDs 111, 112, 113, 114 (e.g., energy usage statistics) using the user device. Additionally, in embodiments the user may configure the BSIEDs 111, 112, 113, 114 using the user device. For example, the user may submit additional parameters to be considered in generating a new or updated BSOM for the BSIEDs 111, 112, 113, 114, as will be discussed further in connection with figures below.

The central processing unit 140 may also be coupled to one or more sensor devices (e.g., 131, 132) and configure to receive sensor data from the sensor devices in generating the a new or updated BSOM for the BSIEDs 111, 112, 113, 114. Systems and methods of generating new BSOMs are discussed further below.

As also shown in FIG. 1, one or more of the BSIEDs 111, 112, 113, 114 may further be communicatively coupled to one or more peripheral or "downstream" devices 170, 180. For example, a BSIED 111 may provide control signals to the downstream devices 170, 180 based on the measurement data collected by the BSIED 111 or other information or instructions received from the central processing unit 140. In certain examples, BSIED 111 may be capable of bidirectional communication with a downstream device 170 such as another BSIED or other programmable device capable of transmitting and receiving data. In certain examples BSIED 111 may also be capable of unidirectional transmission to certain other downstream devices 180.

In certain examples at least one of the downstream devices 170, 180 may be configured to measure same or similar parameters as BSIED 111, for example. However, in certain examples the at least one of the downstream devices 170, 180 may not have the capability to interface with the cloud 150, but may have ability to interface with the BSIED 111. In such examples, the BSIED 111 may act as a "gateway" or "communication proxy" for such downstream devices 170, 180.

In embodiments, by leveraging the cloud-connectivity and enhanced computing resources of the central processing unit 140 relative to the BSIEDs 111, 112, 113, 114, sophisticated analysis can be performed on the BSOD retrieved from one or more BSIEDs, as well as on the additional sources of data discussed above, when appropriate. This analysis can be used to dynamically reprogram BSIEDs (e.g., generate new BSOMs associated with the BSIEDs) responsive to changing or ongoing conditions revealed by the analysis, as will be discussed further in connection with figures below.

Figure 2:
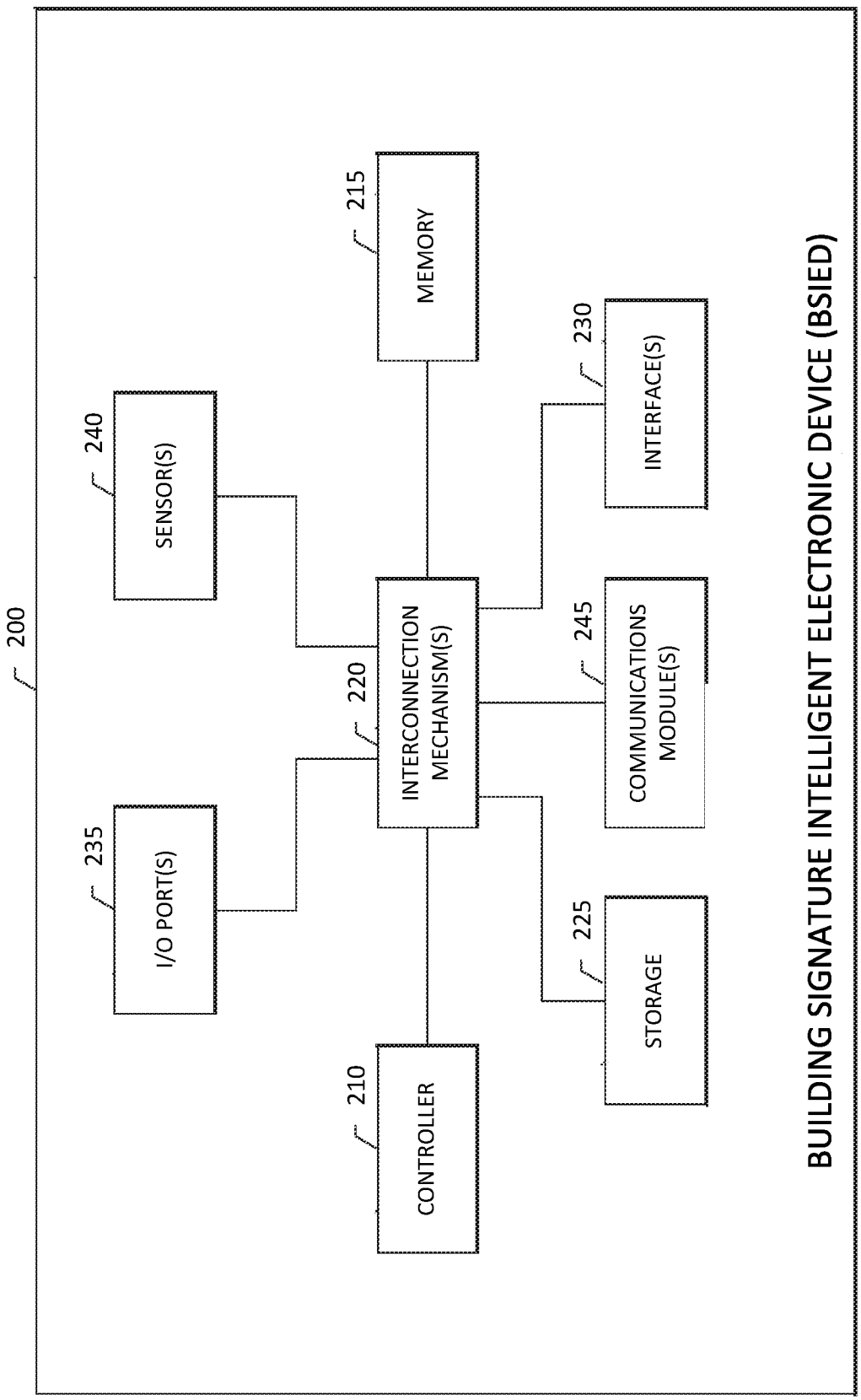
FIG. 2 is a block diagram illustrating an example building signature intelligent electronic device (BSIED) that may be used in a building signature system in accordance with embodiments of the disclosure.

Referring to FIG. 2, an example BSIED 200 that may be suitable for use in a building signature system, such as the building signature system shown in FIG. 1, for example, includes a controller 210, a memory device 215, storage 225, and an interface 230. The BSIED 200 also includes an input-output (I/O) port 235, a sensor 240, a communication module 245, and an interconnection mechanism 220 for communicatively coupling two or more BSIED components 210-245.

The memory device 215 may include volatile memory, such as DRAM or SRAM, for example. The memory device 215 may store storing programs and data collected during operation of the BSIED 200. For example, in embodiments in which the BSIED 200 is configured to monitor or measure one or more building signature parameters associated with building equipment (e.g., 121, shown in FIG. 1) in a building signature system, the memory device 215 may store the monitored building signature parameters. Additionally, the BSOM(s) associated with the BSIED 200, or portions of the BSOM(s), may be stored in the memory device 215 in some embodiments.

The storage system 225 may include a computer readable and writeable nonvolatile recording medium, such as a disk or flash memory, in which signals are stored that define a program to be executed by the controller 210 or information to be processed by the program. The medium may include, for example, a disk or flash memory. The controller 210 may control transfer of data between the storage system 225 and the memory device 215 in accordance with known computing and data transfer mechanisms. In embodiments, the building signature parameters monitored or measured by the BSIED 200, and/or the BSOM(s) associated with the BSIED 200 (or portions of the BSOM(s)), may be stored in the storage system 225.

The I/O port 235 can be used to couple building equipment (e.g., 121, shown in FIG. 1) to the BSIED 200, and the sensor 240 can be used to monitor or measure the building signature parameters associated with the building equipment 200. The I/O port 235 can also be used to coupled external devices, such as sensor devices (e.g., 131, shown in FIG. 1) and/or user input devices (e.g., local or remote computing devices) (not shown), to the BSIED 200. The I/O port 235 may further be coupled to one or more user input/output mechanisms, such as buttons, displays, acoustic devices, etc., to provide alerts (e.g., to display a visual alert, such as text and/or a steady or flashing light, or to provide an audio alert, such as a beep or prolonged sound) and/or to allow user interaction with the BSIED 200.

The communication module 245 may be configured to couple the BSIED 200 to one or more external communication networks or devices. These networks may be private networks within a building in which the BSIED 200 is installed, or public networks, such as the Internet. In embodiments, the communication module 245 may also be configured to couple the BSIED 200 to a cloud-connected hub (e.g., 150, shown in FIG. 1), or to a cloud-connected central processing unit (e.g., 140, shown in FIG. 1), associated with a building signature system including BSIED 200. The cloud-connected central processing unit may be coupled, for example, to receive building signature operational data (BSOD) generated by a BSIED (e.g., 200), and be configured to generate a new or updated BSOM associated the BSIED, for example, based on the BSOD and additional external data received from other sources.

The BSIED controller 210 may include one or more processors that are configured to execute the BSOM(s) associated with the BSIED 200 to perform the specified function(s) of the device. The processor(s) can be a commercially available processor, such as the well-known Pentium™, Core™, or Atom™ class processors available from the Intel Corporation. Many other processors are available, including programmable logic controllers. The controller 210 can execute an operating system to define a computing platform on which the application(s) included in the BSOM(s) of the BSIED can run.

In embodiments, the building signature parameters monitored or measured by the BSIED 200 may be received at an input of the controller 210 as building signature input data (BSID), and the controller 210 may process the BSID using the BSOM(s) associated with the BSIED 200 to generate building signature operational data (BSOD) at an output thereof. In embodiments, the BSOD may correspond to an output of the BSIED 200. The BSOD may be provided at I/O port(s) 235, for example. In embodiments, the BSOD may be received by a cloud-connected central processing unit, for example, for further processing (e.g., to generate new or updated BSOM(s), as briefly discussed above), and/or by building equipment to which the BSIED is coupled (e.g., for controlling one or more parameters associated with the equipment, as will be discussed further below).

Components of the BSIED 200 may be coupled together by the interconnection mechanism 220, which may include one or more busses, wiring, or other electrical connection apparatus. The interconnection mechanism 220 may enable communications (e.g., data, instructions, etc.) to be exchanged between system components of the BSIED 200.

It is understood that BSIED 200 is but one of many potential configurations of BSIEDs in accordance with various aspects of the disclosure. For example, BSIEDs in accordance with embodiments of the disclosure may include more (or fewer) components than BSIED 200. Additionally, in embodiments one or more components of BSIED 200 may be combined. For example, in embodiments memory 215 and storage 225 may be combined.

Figure 3:
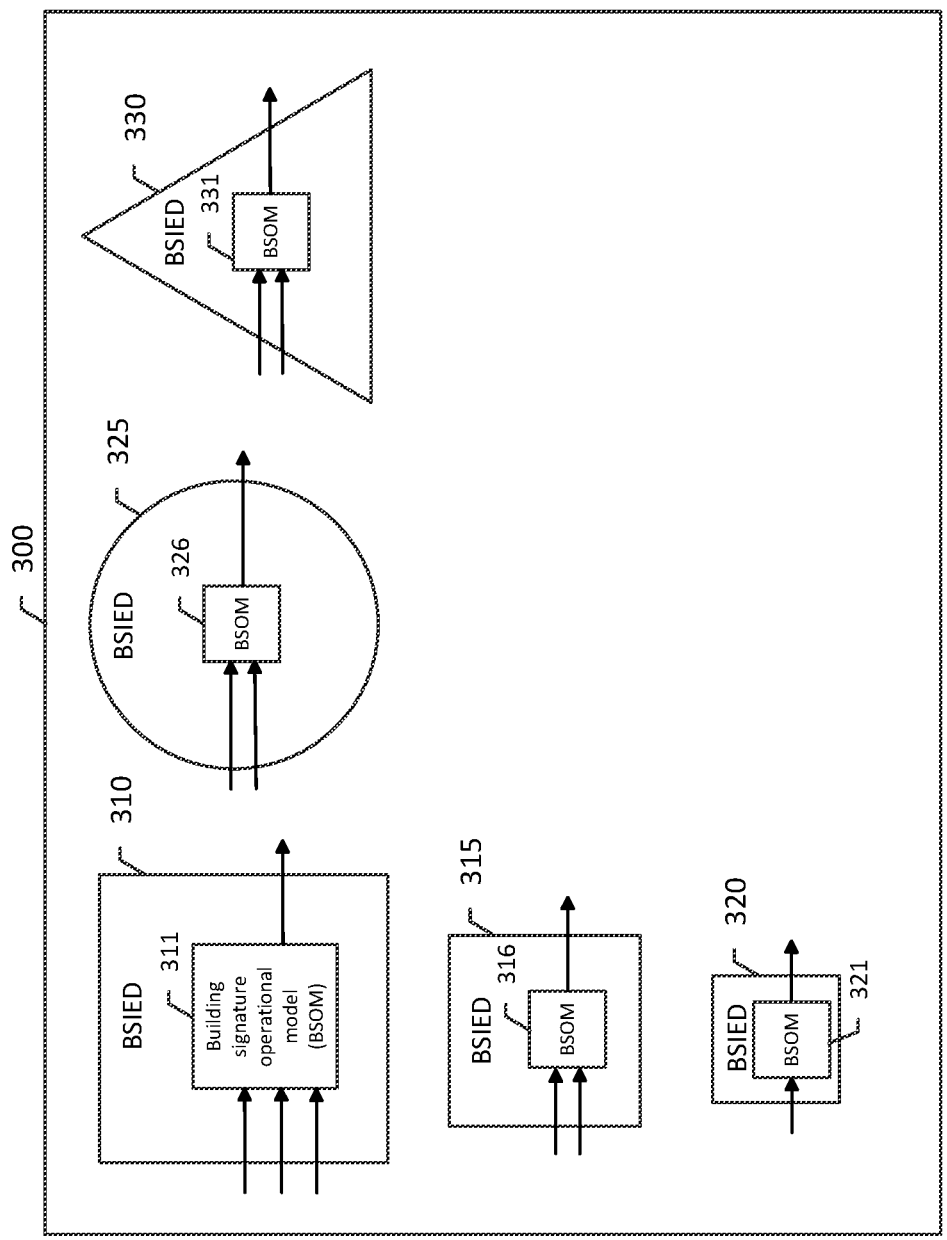
FIG. 3 is a block diagram illustrating an example building associated with a building signature system in accordance with embodiments of the disclosure, the building having a plurality of BSIEDs installed therein.

Referring to FIG. 3, an example building 300 associated with a building signature system in accordance with embodiments of the disclosure is shown having a plurality of BSIEDs 310, 315, 320, 325, 330 installed therein. In embodiments, the BSIEDs 310, 315, 320, 325, 330 may take various forms and be configured to measure or monitor a variety of building signature parameters. For example, BSIEDs 310, 315, 320 may correspond to a first type of BSIED configured to monitor first building signature parameters associated with a first type of building equipment (e.g., 121, shown in FIG. 1) installed in the building 300. Additionally, BSIED 325 may correspond to a second type of BSIED configured to monitor second building signature parameters associated with a second type of building equipment installed in the building 300. Further, BSIED 330 may correspond to a third type of BSIED configured to monitor third building signature parameters associated with a third type of building equipment installed in the building 300.

In embodiments, at least one of the first, second and third BSIED types includes an energy meter, a power quality monitor, a waveform monitor, a programmable sensing device, an uninterruptible power supply, a power quality correction device, and/or a harmonic filter with metering capabilities. Additionally, in embodiments at least one of the first, second and third BSIED types includes an occupancy IED or a weather station IED. Further, in embodiments at least one of the first, second and third BSIED types includes a programmable logic controller (PLC), for example, associated with building equipment (e.g., in building 300). The PLC may, for example, accumulate operational data associated with the building equipment. As one example, the operational data associated with the building equipment may correspond to product output (e.g., number of items produced, such as shoes) by the building equipment.

In embodiments, the building signature operational data generated by at least one of the first, second and third BSIEDs may be used to generate a building signature operational model associated with other ones of the first, second and third BSIEDs. For example, in embodiments in which the first BSIED includes an occupancy IED and the second BSIED includes a PLC associated with building equipment, building signature output data generated by the first BSIED may be used to generate a building signature operational model associated with the second BSIED, for example, to map intensity of equipment output (e.g., as measured by the second BSIED) versus building occupancy (e.g., as measured by the first BSIED).

In embodiments, at least one of the first, second and third building signature parameters monitored by the first, second and third BSIED types includes energy consumption parameters (e.g., voltage, current, power, etc.) associated with the respective building equipment (i.e., first, second, third building equipment).

The BSIEDs 310, 315, 320, 325, 330 shown in FIG. 3 may each have an associated complexity (or set of functional capabilities). For example, BSIED 320 may correspond to a "basic" BSIED, BSIED 315 may correspond to an "intermediate" BSIED, and BSIED 310 may correspond to an "advanced" BSIED. In embodiments, intermediate BSIED 315 may have more functionality (e.g., energy measurement capabilities) than basic BSIED 320, and advanced BSIED 310 may have more functionality than intermediate BSIED 315. For example, in embodiments basic BSIED 320 may be capable of measuring instantaneous voltage, current and power, and advanced BSIED 310 may be capable of measuring instantaneous and average maximum voltage, current, power, frequency, power factor, demand and energy.

In embodiments, intermediate BSIED 315 may also be responsive to more building signature data sources (and building signature input data associated with the building signature data sources) than basic BSIED 320. Additionally, in embodiments advanced BSIED 310 may be responsive to more building signature data sources (and building signature input data associated with the building signature data sources) than intermediate BSIED 315.

As illustrated, each of the BSIEDs 310, 315, 320, 325, 330 has an associated BSOM (here, BSOMs 311, 316, 321, 326, 330). The BSIEDs 310, 315, 320, 325, 330 may be responsive to respective building signature input data to generate building signature operational data using the BSOMs 311, 316, 321, 326, 330. In embodiments, the BSOMs 311, 316, 321, 326, 330 are device and site (e.g., building 300) specific. More particularly, in embodiments the BSOMs 311, 316, 321, 326, 330 may be generated specifically for the BSIEDs 310, 315, 320, 325, 330 to which the BSOMs 311, 316, 321, 326, 330 are associated, and the building 300 in which the BSIEDs 310, 315, 320, 325, 330 are installed. Additional aspects of BSOMs and BSIEDs (including evaluation, generation and selection of BSOMs for BSIEDs) are described further below in connection with figures below.

Referring to FIGS. 4-9, several flowcharts (or flow diagrams) are shown. Rectangular elements (typified by element 405 in FIG. 4), as may be referred to herein as "processing blocks," may represent computer software instructions or groups of instructions. Diamond shaped elements (typified by element 410 in FIG. 4), as may be referred to herein as "decision blocks," represent computer software instructions, or groups of instructions, which affect the execution of the computer software instructions represented by the processing blocks. The processing blocks and decision blocks can represent steps performed by functionally equivalent circuits such as a digital signal processor circuit or an application specific integrated circuit (ASIC).

The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously and vice versa.

Figure 4:
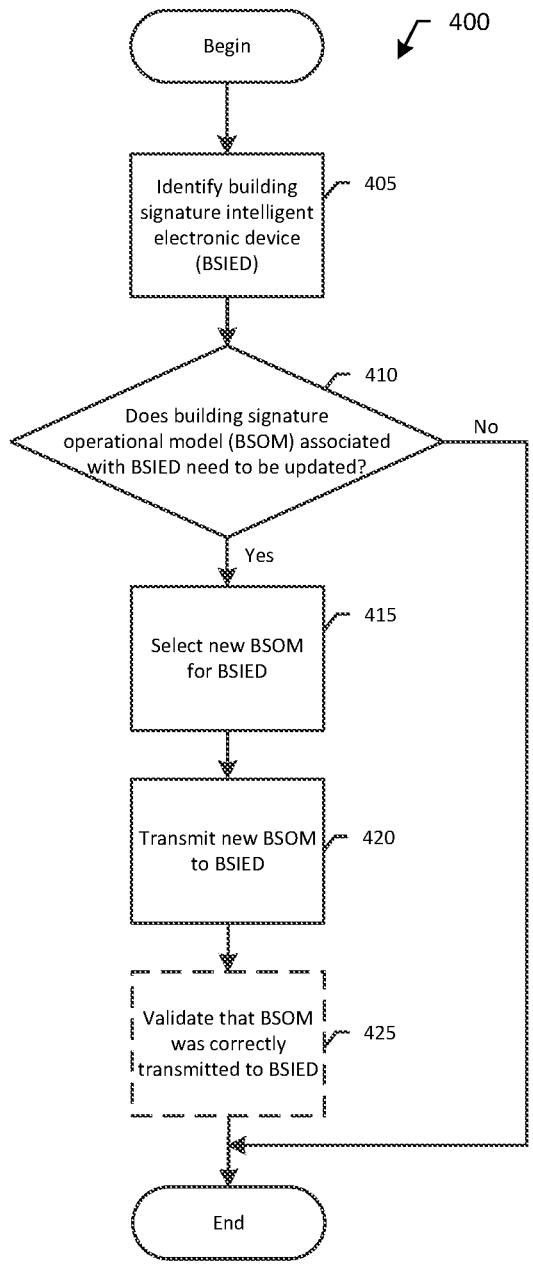
FIG. 4 is a flowchart illustrating an example method for evaluating a building signature operational model (BSOM) associated with a BSIED in accordance with embodiments of the disclosure.

Referring to FIG. 4, a flowchart illustrates an example method 400 for managing (e.g., monitoring and/or updating) a BSIED (e.g., 111, shown in FIG. 1) that can be implemented, for example, on a cloud-connected central processing unit (e.g., 140, shown in FIG. 1). The BSIED may be a BSIED of a building signature system including one or more BSIEDs, and the cloud-connected central processing unit may be communicatively coupled to the BSIED (e.g., through cloud 150, shown in FIG. 1).

As illustrated in FIG. 4, the method 400 begins at block 405, where the cloud-connected central processing unit processes building signature operational data (BSOD) received from the BSIED to identify the BSIED from which the BSOD was received from. An example method for identifying the BSIED is discussed below in connection with FIG. 5. However, however let it suffice here to say that the cloud-connected central processing unit (CCCPU) may identify the BSIED by analyzing the BSOD for identifying information associated with BSIED. The identifying information may, for example, be encoded in the BSOD.

At block 410, the CCCPU processes the BSOD to determine if a building signature operational model (BSOM) associated with the BSIED, and used by the BSIED to generate the BSOD, needs to be updated. Example methods of determining if a BSOM needs to be updated are discussed below in connection with FIGS. 6 and 7. However, however let it suffice here to say that the CCCPU may determine if the BSOM needs to be updated by evaluating if any changes have been made to the BSIED or building signature system including the BSIED, and/or by evaluating the accuracy of the BSOD (or BSOM). In embodiments, the CCCPU may determine if the BSOM needs to be updated by evaluating if a new BSOM exists for the BSIED. As discussed in figures above, a BSIED may have one or more associated BSOMs.

If the CCCPU determines that the BSOM needs to be updated, the method proceeds to a block 415. Alternatively, if the CCCPU determines that the BSOM does not need to be updated, the method may end. In embodiments, subsequent to the method ending, the CCCPU may transmit a message (or other indication) to the BSIED indicating that the BSOM does not need to be updated. In embodiments, the method may be initiated again automatically (e.g., after a predetermined time period) or in response to the CCCPU receiving a control signal from a control source (e.g., a user input device), for example, requesting that BSOM(s) associated with the BSIED be evaluated.

At block 415, in response to determining that the BSOM needs to be updated, the CCCPU selects a new BSOM for the BSIED. In embodiments, the new BSOM is selected from a BSOM library, for example, stored on a memory device associated with the CCCPU. The memory device may contain a plurality of BSOMs. In embodiments, each of the plurality of BSOMs is custom tailored for a particular BSIED, and is site specific (e.g., specific to a building in which the BSIED is installed). The plurality of BSOMs may be generated by the CCCPU, for example, in response to receiving BSOD and input data from one or more respective data sources associated with the BSIEDs for which the plurality of BSOMs are intended. In embodiments, the data sources include at least one of a temperature sensor, a humidity sensor, and an occupancy sensor configured to generate respective temperature, humidity and occupancy input data pertaining to the environment(s) in which the BSIEDs are installed.

In embodiments, the new BSOM for the BSIED is selected based, at least in part, on one or more characteristics associated with the BSIED. The characteristics associated with the BSIED may include, for example, BSIED type, BSIED complexity, and building signature parameters monitored by the BSIED. A BSIED of a first type that is responsive to a first type of building signature input data (BSID) may, for example, require a different BSOM than a BSIED of a second type that is responsive to a second type of BSID that is different from the first type of BSID. Additional aspects of selecting a BSOM for a BSIED (and generating a BSOM) are described below in connection with FIG. 8, for example.

At block 420, the new BSOM is transmitted to the BSIED (e.g., via the cloud 150) for installation on the BSIED.

Additionally, at block 425, which is optional in some embodiments, a validation procedure may be used to confirm that the BSOM was correctly transmitted by the CCCPU to the BSIED. For example, a checksum or similar method may be used (on the BSIED and/or CCCPU) to confirm that the BSOM was received by the BSIED intact and unaltered.

In embodiments, operation of the new BSOM may also be validated prior to transmission to the BSIED to confirm that the new BSOM operates as expected. For example, BSID may be processed on the CCCPU using the new BSOM to generate BSOD associated with the new BSOM. Additionally, accuracy of the BSOD may be validated, for example, by comparing the BSOD (i.e., new BSOD) to historical BSOD.

In some embodiments, the BSID may be received from one or more building signature data sources (BSDSs) at an input of the BSIED, and be made available to the CCCPU via the cloud. In embodiments, the BSDSs may include equipment to which the BSIED is coupled, and the BSID may include energy usage information associated with the BSDSs. Additionally, in embodiments the BSID may correspond to test BSID (e.g., specifically for validating BSOMs), and the test BSID may be retrieved from a memory device of the BSIED.

Subsequently to block 425, the method 400 may end. In embodiments, the method 400 ending may be indicative of a new BSOM having been successfully installed on the BSIED. In embodiments, once the new BSOM is successfully installed on the BSIED, the BSIED may disconnect from the cloud and operate independently from the cloud. This is an advantage because it allows intentional disconnection (for security reasons, for example) and also to provide protection against unintentional disconnection, as would result from a communications interruption with the cloud.

Figure 5:
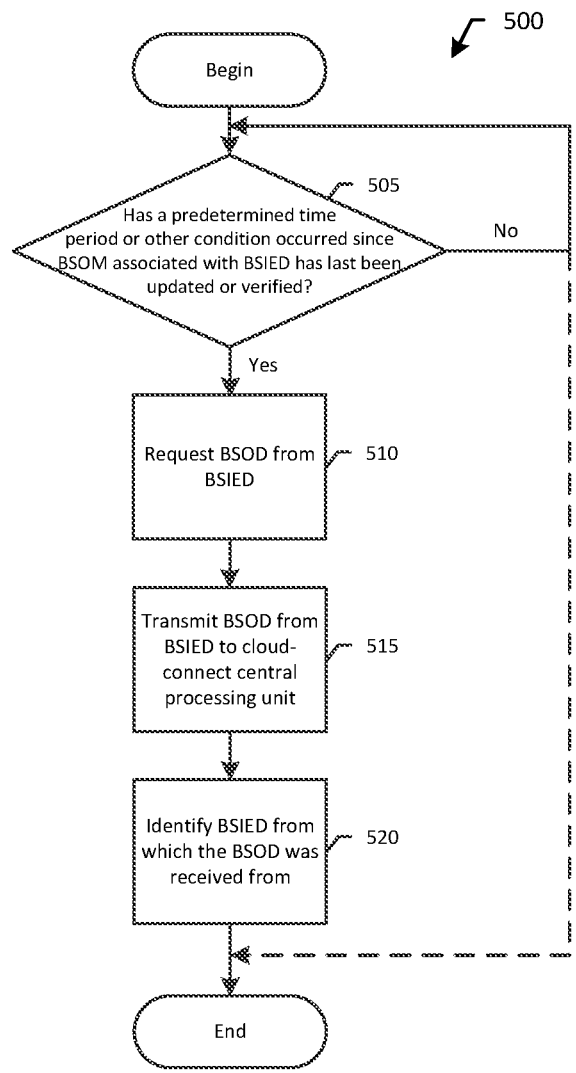
FIG. 5 is a flowchart illustrating an example method for identifying a BSIED from building signature operational data (BSOD)

Referring to FIG. 5, a flowchart illustrates an example method 500 for identifying a BSIED. The method 500 may be implemented, for example, on a CCCPU that is communicatively coupled to the BSIED. In embodiments, the method 500 may correspond to example steps performed at block 405 of method 400 discussed above in connection with FIG. 4.

As illustrated in FIG. 5, the method 500 begins at block 505, where the CCCPU determines if a predetermined time period has elapsed, or another predetermined condition has occurred, since a BSOM associated with the BSIED has last been updated or verified. As discussed in figures above, a BSIED may have one or more associated BSOMs.

In embodiments, the CCCPU may determine if the predetermined time period has elapsed, or another predetermined condition has occurred, by comparing the version number, update history, etc. of the BSOM with the version number, update history, etc. of the latest version of the BSOM. The CCCPU may, for example, store version numbers, update histories, etc. of BSOM(s) currently on the BSIED, as well as version numbers, update histories, etc. of a number of BSOM(s) that may be suitable for the BSIED, and other BSIEDs, on a memory device associated with the CCCPU. Recomputation (or regeneration) of a BSOM might be triggered, for example, by an improvement in the algorithms used to generate the BSOM from the BSID and BSOD.

In embodiments, the predetermined time period is associated with the BSIED (or the BSOM associated with the BSIED). For example, a BSIED comprising a BSOM which requires frequent updates, for example, due to changing environmental (e.g., temperature and humidity) conditions, may have a predetermined time period that is less than the predetermined time period for a BSIED comprising a BSOM which requires less frequent updates. Additionally, in embodiments the predetermined time period is associated with a group of BSIEDs. The group of IEDs may comprise same or similar types of BSIEDs in some embodiments, and different types of BSIEDs in other embodiments. For example, the group of BSIEDs may comprise a plurality of BSIEDs associated with a particular building or geographic location. The predetermined time period may correspond to a day, a week, a month, or substantially any other time period as may be suitable for the BSIED and/or application(s) associated with the BSIED. In embodiments, the BSOM is a model that captures at least how the building in which the BSIED is installed reacts to changes in weather (and other conditions) under substantially any circumstance. As such, rapidly varying weather, for example, may not require frequent changes to the model since the model is designed to handle that. However, in embodiments in which the building changes frequently in its control system or construction, for example, then the BSOM may need to be updated (sometimes frequently) in response to the changes.

If the CCCPU determines that the predetermined time period has elapsed, or another predetermined condition has occurred since BSOM associated with the BSIED has last been updated or verified, the method proceeds to a block 510. Alternatively, if the CCCPU determines that the predetermined time period has not elapsed, or another predetermined condition has not occurred since the BSOM has last been updated or verified, the method may return to block 5105 and repeat again in some embodiments. In other embodiments, the method may end and be initiated again, for example, in response to the CCCPU receiving a control signal from a control source (e.g., a user input device).

At block 510, the CCCPU requests BSOD from the BSIED. For example, the CCCPU may send a data request signal or packet to the BSIED (e.g., via the cloud) to request BSOD from the BSIED. At block 515, in response to receiving the data request signal or packet, the BSIED may transmit BSOD to the CCCPU (e.g., via the cloud). In embodiments, the BSOD corresponds to (or is indicative of) one or more building signature parameters (e.g., energy usage parameters) monitored or sensed by the BSIED. Additionally, in embodiments the BSOD may contain identifying information associated with the BSIED. For example, at least a portion of the BSOD may include identifying information associated with the BSIED embedded therein. Additionally or alternatively, prior to, after, or during transmission of the BSOD, the BSIED may transmit identifying information associated with the BSIED to the CCCPU. The identifying information may include, for example, a serial number associated with the BSIED. The serial number associated with the BSIED may be used, for example, to identify the building in which the BSIED is installed, the application(s) in which the BSIED is being used, customer associated with the BSIED, etc. In embodiments, the identification may occur using commercial tracking software, for example.

At block 520, the CCCPU may identify the BSIED based on the BSOD (and/or other information) received from the BSIED at block 515. Subsequent to block 520, the method 500 may end. In embodiments, the method ending may be indicative of the CCCPU having identified a BSIED from which BSOD is received from, and the CCCPU being ready to determine if a BSOM associated with the BSIED needs to be updated (e.g., at block 410 of method 400).

Figure 6:
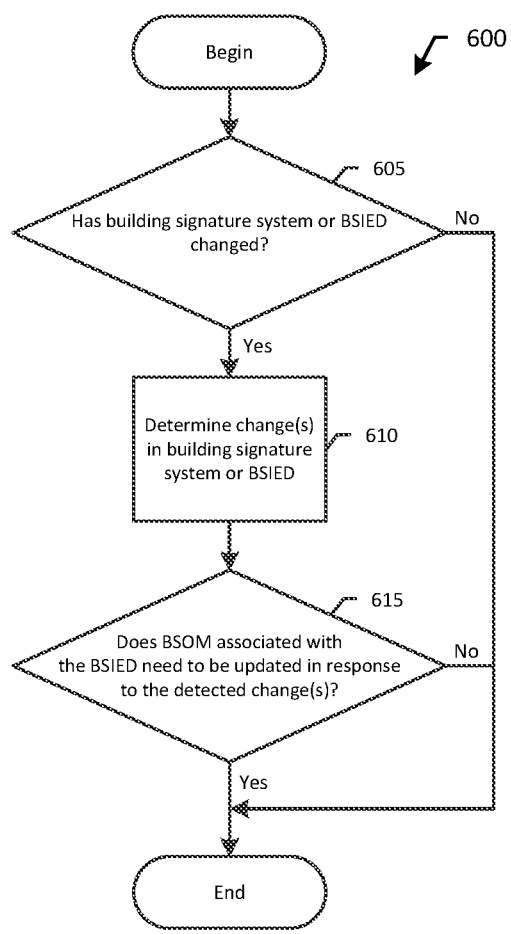
FIG. 6 is a flowchart illustrating an example method for determining if a BSOM associated with a BSIED needs to be updated.

Referring to FIG. 6, a flowchart illustrates an example method 600 for determining if a BSOM associated with a BSIED needs to be updated. In embodiments, the method 600 may correspond to example steps performed at block 410 of method 400 discussed above in connection with FIG. 4.

As illustrated in FIG. 6, the method 600 begins at block 605, where the CCCPU determines if any changes (e.g., software and/or hardware changes) have been made to a BSIED or a building signature system which may include the BSIED.

In embodiments, the CCCPU may examine BSOD, alone or in combination with other types of data, received from the BSIED (e.g., at block 515 of method 500) or other sources, to determine if any changes have been made to the BSIED or building signature system. For example, in embodiments the BSOD received from the BSIED may contain information indicating a number of devices (e.g., BSIED or otherwise) in the building signature system, and the CCCPU may use this information to determine if any changes have been made to the system. Additionally, in embodiments the BSOD may contain device specific information (e.g., hardware and/or software information) associated with the BSIED from which the BSOD was received (and/or of other devices in the building signature system), and the CCCPU may use this information to determine if any changes have been made to the BSIED (or the system).

In embodiments, the CCCPU may also monitor the building signature system (e.g., by examining data received from one or more sensors) to determine if any changes have been made to the system. For example, the CCCPU may monitor the system to determine if a new device has been added to (or removed from) the system. Additionally, the CCCPU may be coupled a user input device and configured to receive user input indicating that a new device has been added to (or removed from) the system. For example, a human operator might initiate a request for generation or calculation of a new BSOM based on a known change (or changes) in the building that is not evident to the CCCPU. If, for example, light bulbs in the building were replaced with more efficient light bulbs on a particular date, then a human initiated request might be sent to the CCCPU to request a new BSOM be created to characterize the post-upgrade behavior.

If the CCCPU determines that a change has been made to the building signature system or BSIED (e.g., in response to monitoring by the CCCPU or user input), the method 600 proceeds to a block 610. Alternatively, if the CCCPU determines that no changes have been made to the building signature system or BSIED (e.g., in response to monitoring by the CCCPU or user input), the method 600 may end. The method 600 ending may, for example, be indicative of a new or updated operational model not being needed in response to changes in the building signature system or BSIED since no changes to the building signature system or BSIED were detected.

At block 610, the CCCPU determines the particular change(s) in the building signature system or BSIED (i.e., at block 605, the CCCPU detects if there are any changes, and at block 610, the CCCPU identifies the changes). In embodiments, the CCCPU determines the change(s) in the building signature system or BSIED by examining at least one of: the BSOD received from the BSIED, data received from one or more other data sources (e.g., sensors) in the building signature system, and user input data. For example, in embodiments in which the BSIED receives a hardware or firmware update, the BSIED may encode a message in BSOD indicating the update to the BSIED, and the CCCPU may examine the message in the BSOD to determine the change(s) in the BSIED. As another example, in embodiments in which a new BSIED has been added to the building signature system, the new BSIED (or a sensor communicatively coupled to the system) may transmit a message to the CCCPU indicating that the new BSIED has been added to the system. As a further example, in embodiments in which a new BSIED has been added to the system, a user may provide an indication that the new BSIED has been added to the system using a user input device coupled to the CCCPU.

At block 615, the CCCPU determines the BSOM associated with the BSIED needs to be updated in response to the detected change(s) in the building signature system or the BSIED. For example, in embodiments in which the BSIED receives a hardware or firmware update, the CCCPU may determine that the BSIED requires a new or updated BSOM. Additionally, in embodiments in which a new BSIED is added to the building signature system, the CCCPU may determine that the BSIED requires a new or updated BSOM.

If the CCCPU determines that the BSOM associated with the BSIED needs to be updated in response to the detected change(s), the method 600 may end and the CCCPU may proceed to select a new BSOM for the BSIED (e.g., at block 415 of method 400). Alternatively, if the CCCPU determines that the BSOM does not need to be updated in response to the detected change(s), the method 600 may end and the CCCPU may proceed to inform the BSIED that the BSOM does not need to be updated (e.g., due to the BSIED having the latest BSOM for the BSIED).

Figure 7:
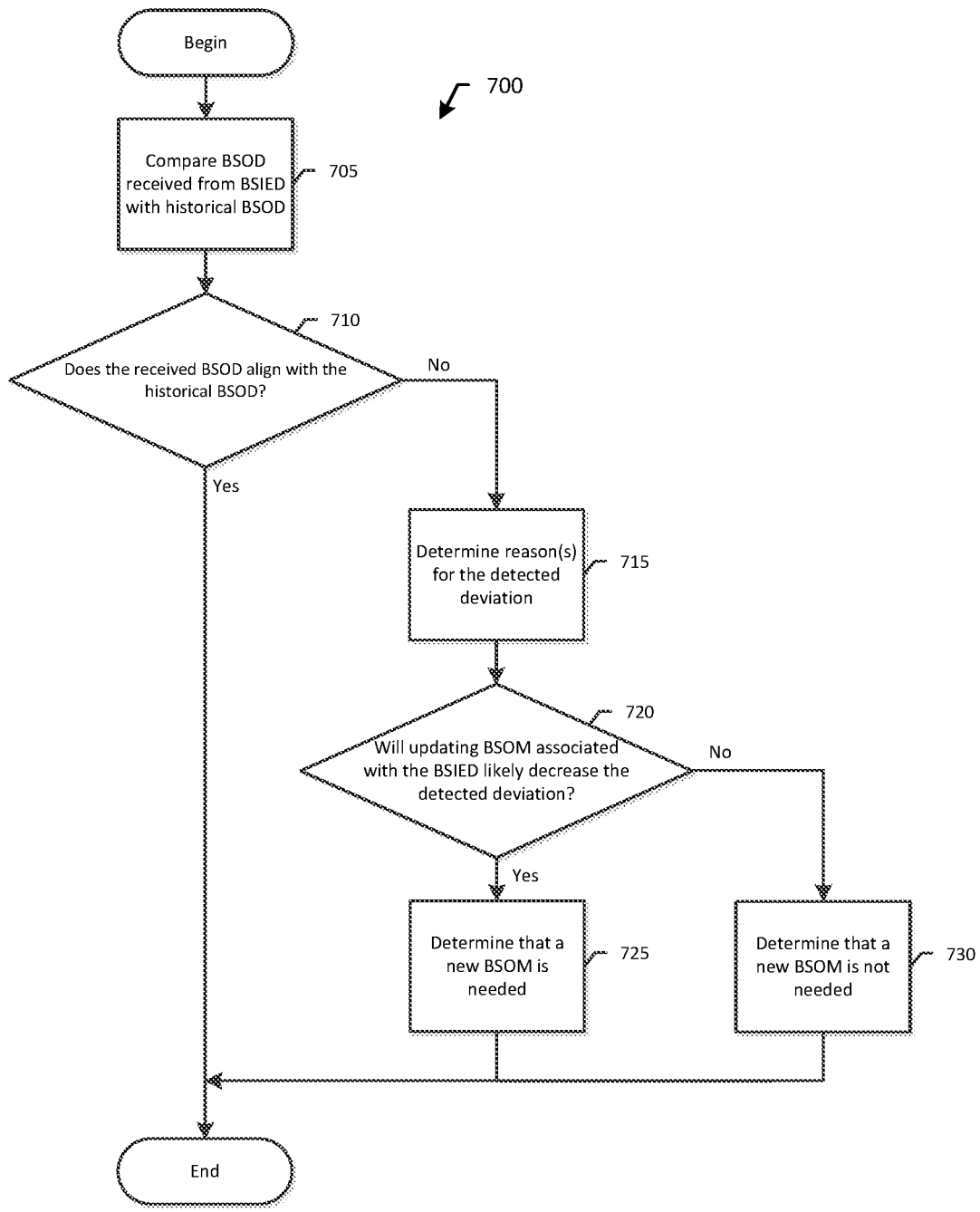
FIG. 7 is a flowchart illustrating an example method for determining if a BSOM associated with a BSIED needs to be updated.

Referring to FIG. 7, a flowchart illustrates another example method 700 for determining if a BSOM associated with a BSIED needs to be updated. Similar to method 600, in embodiments method 700 may correspond to example steps performed at block 410 of method 400 discussed above in connection with FIG. 4. In embodiments, method 700 may be performed alone or in combination with method 600 (and other methods) to determine if the BSOM needs to be updated.

As illustrated in FIG. 7, the method 700 begins at block 705 where the CCCPU compares BSOD retrieved from a BSIED (e.g., at block 405 of method 400) with historical BSOD associated with the BSIED. In embodiments, the historical BSOD may be stored on a memory device associated with the CCCPU.

At block 710, the CCCPU determines if the retrieved BSOD aligns with the historical BSOD. If the CCCPU determines that the retrieved BSOD aligns with the historical BSOD, the method 700 may end. The method 700 ending may, for example, be indicative of the BSOM associated with the BSIED not needing to be updated since the retrieved BSOD aligns with the historical BSOD (i.e., the retrieved BSOD is determined to be accurate). Alternatively, if the CCCPU determines that the retrieved BSOD does not align with the historical BSOD (i.e., the retrieved BSOD is determined to be inaccurate), the method proceeds to a block 715.

Taking the BSOD to be the quantity predicted by the BSOM (building energy consumption being the most common example), accuracy of the BSOM may be assessed by the 'CUSUM of residuals' method, for example, where a running sum of the difference between the model output and the measured energy consumption is evaluated over a period of months or more. If the measured values of energy consumption have a sustained difference from the model's prediction, for example, it may be time to update the model. A rule like "if the predicted energy consumption for a three month period differs from the actual consumption by more than 10%, recompute the model" would be an example. Other example methods that may be used to assess accuracy of the BSOM are described in co-pending U.S. Published Application No. 2013/0151179 entitled "Automated Monitoring For Changes in Energy Consumption Parameters," which is assigned to the assignee of the present disclosure and incorporated herein by reference in its entirety.

At block 715, the CCCPU determines the reason(s) for the detected deviation between the retrieved BSOD and the historical BSOD. For example, the CCCPU may analyze temperature information to determine if the BSIED from which the BSOD was retrieved has been subject to unusually high or low temperatures (e.g., due to an exceptionally long winter season). In embodiments, current temperature information may be received from one or more temperature sensors (e.g., 131, shown in FIG. 1) proximate to the BSIED. Additionally, in embodiments historical temperature information may be stored in a memory device associated with the CCCPU, and/or received from one or more external data sources (e.g., 191, shown in FIG. 1). The external data sources may include, for example, the United States National Weather Service.

In embodiments, the CCCPU may also analyze occupancy information to determine if occupancy of a building in which the BSIED is installed has significantly increased or decreased, for example, due to an increased or decreased demand for production at the building. In embodiments, current occupancy information may be received from one or more occupancy sensors (e.g., 131, shown in FIG. 1) proximate to the BSIED. Additionally, in embodiments historical occupancy information may be stored in a memory device associated with the CCCPU.

At block 720, the CCCPU determines if updating a BSOM associated with the BSIED will likely decrease the detected deviation (e.g., due to the current BSOM being inaccurate, or not the latest BSOM for the BSIED). As discussed above, the BSOM associated with the BSIED is used to generate the BSOD received by the CCCPU.

If the CCCPU determines that updating the BSOM will likely decrease the detected deviation, the method 700 proceeds to a block 725 where it is determined that a new BSOM is need for the BSIED. Alternatively, if the CCCPU determines that updating the operational model will likely not decrease detected deviation (e.g., due to the BSIED already having the latest BSOM for the BSIED), the method 700 proceeds to a block 730 where it is determined that a new BSOM is not needed for the BSIED. After blocks 725 and 730, the method 700 may end. The method ending may, for example, be indicative of the detected deviation not being due to the current operational model being outdated or inaccurate. For example, the detected deviation may be due to a hardware issue with the BSIED (which may require repair by a technician).

Figure 8:
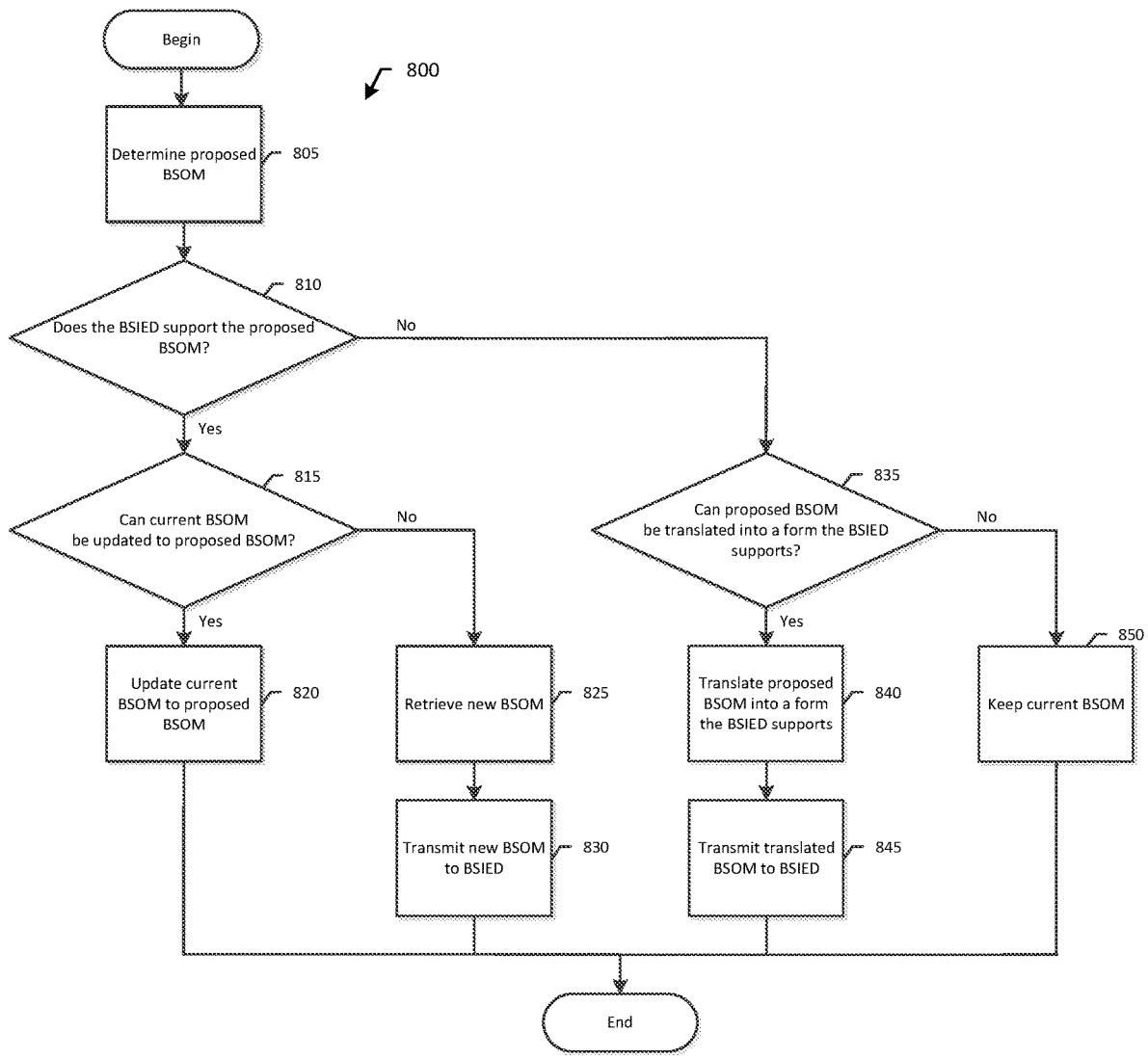
FIG. 8 is a flowchart illustrating an example method for selecting a new BSOM for a BSIED.

Referring to FIG. 8, a flowchart illustrates an example method 800 for selecting a new BSOM for a BSIED, for example, in response to the CCCPU determining that a new BSOM is need for the BSIED. In embodiments, the method 800 may correspond to example steps performed at block 415 of method 400 discussed above in connection with FIG. 4.

As illustrated in FIG. 8, the method 800 begins at block 805, where the CCCPU determines a proposed BSOM for the BSIED. In embodiments, the proposed BSOM is selected from a plurality of BSOMs stored on a memory device associated with the CCCPU. The memory device may contain a plurality of BSOMs (e.g., in a BSOM library). In embodiments, the proposed BSOM is selected from the plurality of BSOMs based on the BSIED type, and particular configuration of the BSIED. For example, a BSIED responsive to a first set of building signature inputs may require a different BSOM from a BSIED responsive to a second set of building signature inputs that is different from the first set of building signature inputs.

As briefly discussed above in connection with FIG. 4, in embodiments the plurality of BSOMs may be generated by the CCCPU in response to receiving BSOD and input data from one or more respective data sources associated with the BSIEDs for which the plurality of BSOMs are intended. For example, a BSIED corresponding to an electrical meter configured to monitor energy consumption of a building in which the BSIED is installed, may have a BSOM (e.g., a custom BSOM) generated in response to BSOD (e.g., meter data) received from the BSIED and other driver data associated with a building in which the BSIED is installed. In embodiments, the driver data may correspond to temperature data (e.g., average temperature), wind data (e.g., wind speed), production data (e.g., production units), and occupancy data. In embodiments, the BSOM can be generated in response to the BSOD and other driver data, and by examining historical performance of a building's consumption against historical environmental data, using a variety of techniques including, for example, the ASHRAE 14-2002 standard for energy modeling.

In embodiments, the techniques used to create the BSOMs may be updated from time to time as "better" (e.g., more accurate) methods are developed. Due to the BSOMs being created in the cloud, the BSOMs may be more amenable to frequent updates.

Additionally, in embodiments the BSOM may be periodically adjusted or tuned, for example, in response to user input. For example, a user on a user device communicatively coupled to the CCCPU may transmit user input data to the CCCPU and the CCCPU may adjust or tune the operational model in response to the user input data. The BSOM may be tuned, for example, using user input data containing information that is not already encoded in the BSOD that the CCCPU uses to generate the operational model. Additionally, BSOD that is known to be invalid (or otherwise inaccurate), for example, due to a plant maintenance shutdown, can be removed from the BSOD in response to the user input.

At block 810, the CCCPU determines if the BSIED supports the proposed BSOM. In embodiments, the CCCPU determines if the BSIED supports the proposed BSOM by evaluating one or more parameters (or characteristics) of the BSIED (e.g., make, model, etc. of the BSIED) with parameters (e.g., BSIED make, BSIED model, etc.) that the proposed BSOM supports. For example, a relatively simple BSIED may not support a BSOM intended for a more complex BSIED. The more complex BSIED may, for example, be responsive to more building signature inputs than the relatively simple BSIED, and be configured to generate more outputs (e.g., building signature operational data) than the relatively simple BSIED. As discussed in figures above, BSOMs according to embodiments of the disclosure are custom tailored for a particular BSIED, and are site specific (e.g., specific to a building in which the BSIED is installed).

If the CCCPU determines that the BSIED supports the proposed BSOM, the method proceeds to a block 815. Alternatively, if the CCCPU determines that the BSIED does not support the proposed operational BSOM, the method proceeds to a block 835.

At block 815, the CCCPU determines if the current BSOM (i.e., the BSOM currently used by the BSIED) can be updated to the proposed BSOM. For example, in some embodiments one or more parameters can be added to, removed from, or modified in the current BSOM to update the current BSOM to the proposed BSOM. The foregoing may, for example, reduce (or ideally eliminate) any downtime for the BSIED in updating the BSOM. For example, in embodiments in which parameters can be added to, removed from, or modified in the current BSOM to update the current BSOM to the proposed BSOM, the CCCPU can generate the new or modified parameters, and transmit them to the BSIED for updating without interrupting operation of the BSIED. This avoids any interruption in operation of the BSIED that might result from a more invasive update of the device's operation, and avoids the risk that might accompany a firmware update.

If the CCCPU determines that the current BSOM can be updated to the proposed BSOM, the method proceeds to a block 820. Alternatively, if the CCCPU determines that the current BSOM cannot be updated to the proposed BSOM (e.g., due to various operational model constraints), the proceeds to a block 825.

At block 820, the CCCPU generates the new or updated parameters for the BSOM, and/or generates a message indicating which parameters should be removed from the current BSOM. Examples of parameters that may be updated in a BSOM include, for example, regression coefficients of driver variables in an ASHRAE-2002 style regression model, or the schedule times of switching between models for a time-segmented model. In embodiments, the new or updated parameters of the BSOM may generated (or adjusted or tuned) in response to user input (e.g., from an "expert" user through a user device). In embodiments, the user input may be received directly at the CCCPU from the user device (e.g., via the cloud), or the user input may be received by the BSIED (e.g., through a local connection to the BSIED), and transmitted to the CCCPU from the BSIED. Expert tuning of parameters may result from personnel familiar with energy modeling adjusting for biases in the BSID used to create the BSOM that are unknown to the CCCPU. For example, if the BSID used to create the most recent BSOM included a significant interruption in activity in the modeled building as a result of planned or unplanned downtime, an expert operator may adjust the resulting model parameters to remove the influence of the atypical data.

At block 820, the CCCPU may also transmit the new or updated parameters to the BSIED for updating the current BSOM, and/or transmit the message indicating which parameters should be removed from the current BSOM, to the BSIED for updating the BSOM. In response to receiving the new or updated parameters, or the message, the BSIED may update the BSOM. Alternatively, the CCCPU may update the BSOM on the CCCPU, and transmit the updated BSOM to the BSIED. The updated BSOM may be stored on a memory device of the BSIED, and be used by the BSIED for processing building signature inputs to generate BSOD.

Alternatively, at block 825, after having determined that the current BSOM cannot be updated to the proposed BSOM, the CCCPU may generate a new BSOM (or retrieve the proposed BSOM, and use the proposed BSOM as the new BSOM). At block 830, the CCCPU transmits the new BSOM (i.e., the proposed BSOM) to the BSIED. The new BSOM may be stored on a memory device of the BSIED, and be used by the BSIED for processing building signature inputs to generate BSOD.

Returning now to block 810, if the CCCPU determines that the BSIED does not support the proposed BSOM, the method proceeds to block 835 where the CCCPU determines if the proposed BSOM can be translated into a form the BSIED supports. For example, a BSOM intended for a relatively complex BSIED (e.g., an "advanced" BSIED) may be translated into a form suitable for a less complex BSIED (e.g., a "basic" or "intermediate" BSIED). For example, the BSOM intended for the relatively complex BSIED may be responsive to a first plurality of building signature inputs, while the simpler BSIED is responsive to a second plurality of building signature inputs that is less than the first plurality of building signature inputs. In some embodiments, the BSOM can be translated (or modified) to work with the simpler BSIED (and second plurality of building signature inputs).

In embodiments, a basic BSIED may, for example, only respond to outdoor weather temperature while an intermediate BSIED may run a model with still only temperature as a driver, but could use one set of coefficients for weekdays and another for weekends. An advanced BSIED might support a full list of drivers, such as outdoor weather temperature, number of occupants on a given day, production activity metrics specific to the activity in the building (units manufactured in a manufacturing business), hours of sunlight per day, wind speed, and relative humidity, for example, as well as be able to switch between versions of the models (sets of driver parameters) based on working/non-working hours as well as a work week/weekend/holiday calendar, for example.

If the CCCPU determines that the proposed BSOM can be translated into a form the BSIED supports, the method proceeds to a block 840. Alternatively, if the CCCPU determines that the proposed BSOM cannot be translated into a form the BSIED supports, the method proceeds to a block 850.

At block 840, the CCCPU translates the proposed BSOM into a form the BSIED (i.e., generates a new operational model). Additionally, at block 845, the CCCPU transmits the translated (or new) operational model to the BSIED. The new BSOM may be stored on a memory device of the BSIED, and be used by the BSIED for processing building signature inputs to generate BSOD.

Alternatively, at block 850, after having determined that the proposed BSOM cannot be translated into a form the BSIED supports, the CCCPU may determine that the BSIED should keep using the current BSOM. In some embodiments, the CCCPU may generate and transmit a message or notification to the BSIED indicating that the BSIED should keep using the current BSOM.

In embodiments, the method 800 may end after blocks 820, 830, 845 or 850. The method ending may, for example, be indicative of a BSOM having been selected for the BSIED.

Figure 9:
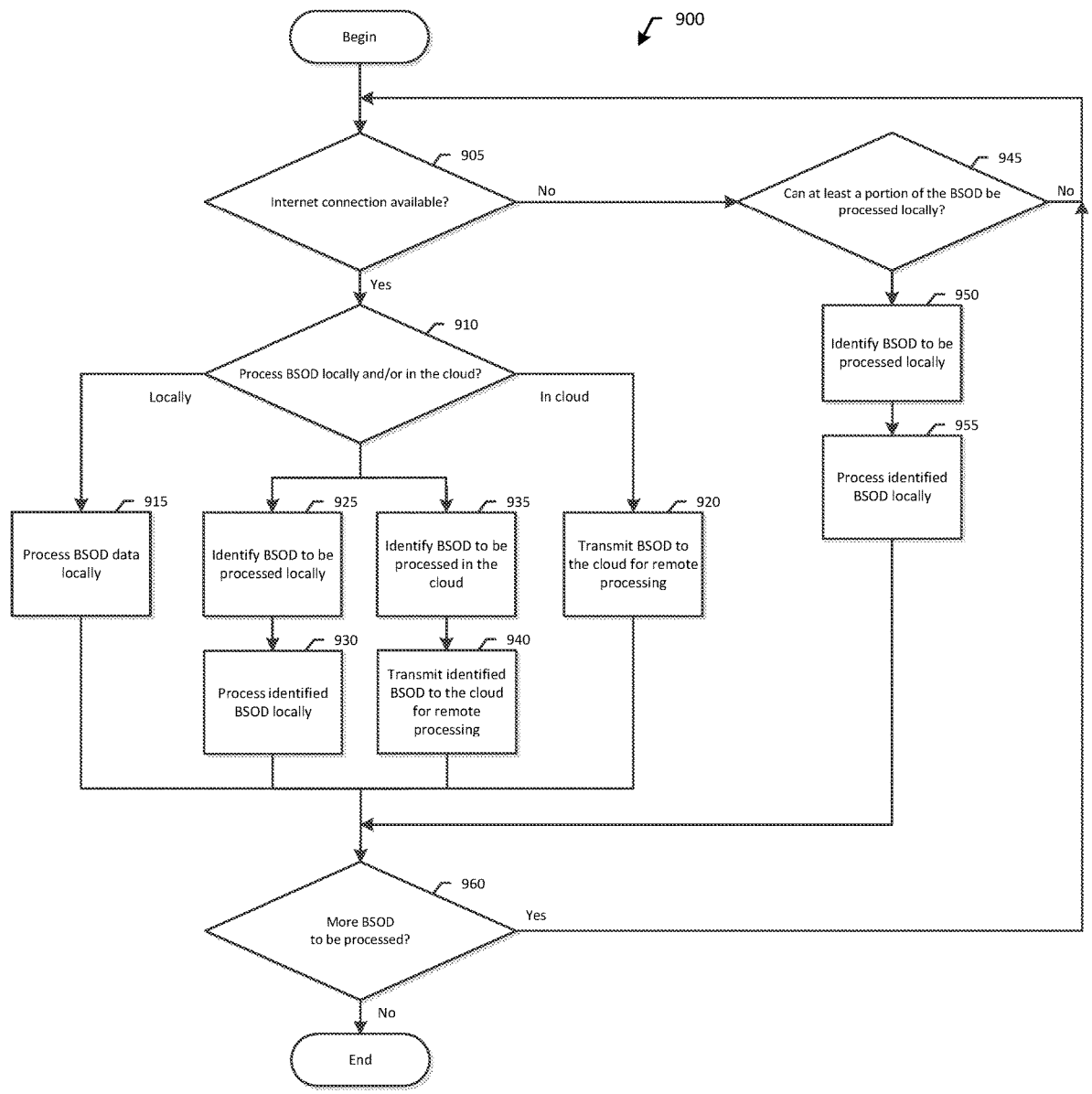
FIG. 9 is a flowchart illustrating an example method for determining if BSOD generated by a BSIED should be processed locally or in the cloud.

Referring now to FIG. 9, a flowchart illustrates an example method 900 for managing processing of BSOD generated by a BSIED (e.g., 111, shown in FIG. 1). In embodiments, the method 900 can be implemented on the BSIED, for example.

As illustrated in FIG. 9, the method 900 begins at block 905 where the BSIED determines if an Internet connection is available. If the BSIED determines that there is an Internet connection available, the method proceeds to a block 910. Alternatively, if the BSIED determines that an Internet connection is not available, the method proceeds to a block 945.

At block 910, the BSIED determines if the BSOD should be processed locally (e.g., on the BSIED or on a cloud-connected hub communicatively coupled to the BSIED) and/or in the cloud (e.g., on a CCCPU). If the BSIED determines that the BSOD should be processed locally, the method proceeds to a block 945 where the BSOD is processed locally, for example, to generate output data. In embodiments, the output data may be transmitted to an output device (e.g., a display device, for viewing by a user). Additionally, in embodiments the output data may correspond to, or be used to generate, a control signal (e.g., a control signal for controlling building equipment to which the BSIED is coupled).

For example, in a BSOM that is fed forecast data for the drivers (e.g., tomorrow's weather), the BSOD generated by the BSIED may be an estimate of future energy consumption. This information may constitute a control signal that might be used to control the amount of energy retrieved from battery storage for a facility or otherwise signal energy systems to prepare for a certain level of demand in the coming day. Applications of this kind gain a particular advantage from being able to operate correctly when the system is disconnected from the cloud for security reasons or unplanned interruptions in cloud communications.

In some embodiments, it may be preferable to process at least at portion of the BSOD locally. For example, it may be preferable to process at least at portion of the BSOD locally in embodiments in which the BSOM is a relatively simple operational model, and processing the BSOD locally on the BSIED is quicker than processing the BSOD remotely in the cloud. Additionally, it may be preferable to process at least a portion of the BSOD locally in embodiments in which data security is a concern. In particular, by processing the BSOD locally, the operational data may be less susceptible to being compromised (e.g., accessed and modified) by unwanted sources (e.g., since the BSOD does not leave the premises). Further, it may be preferable to process at least a portion of the BSOD locally in embodiments in which the BSOD is used to control processes (or equipment) on the premises, for example, through a control signal, as discussed above.

Alternatively, at block 910, if the BSIED determines that the BSOD should be processed in the cloud, the method proceeds to a block 920 where the BSOD is transmitted to the cloud (e.g., the CCCPU) for remote processing, for example, to generate output data (or a new BSOM for the BSIED). In embodiments, the BSIED may determine that the BSOD should be transmitted to the cloud when processing the BSOD locally would impact performance of the BSIED (e.g., due to the local processing occupying substantial processing resources of the BSIED).

Alternatively, at block 910, if the BSIED determines that the BSOD should be processed both locally and in the cloud, the method proceeds to blocks 925 and 935. At block 925, the BSIED identifies portions of the BSOD that should be processed locally. In embodiments, the portions may be identified based on BSIED (or other local device) capabilities. For example, an "advanced" BSIED with robust processing capabilities may be able to process a substantial portion of the BSOD, while a "basic" BSIED with less processing capabilities than the "advanced" BSIED may only be able to process a small portion of the BSOD. At block 930, the BSIED (or other local device) processes the identified portions of the BSOD. In embodiments, the identified portions of the BSOD may be processed to generate output data.

At block 935, the BSIED identifies portions of the BSOD that should be processed in the cloud. In embodiments, model computation in the cloud is only necessary when there is cloud accessible data that the BSIED does not have access to. The cloud accessible data may include, for example, community-derived data about other facilities that the CCCPU has access to, but which the on-site BSIED does not. At block 940, the BSOD is transmitted to the cloud (e.g., the CCCPU) for remote processing, for example, to generate output data (or a new BSOM for the BSIED).

Returning now to block 905, after having determined that an Internet connection is not available, the method proceeds to a block 945. At block 945, the BSIED determines if at least a portion of the BSOD can be processed locally (e.g., on the BSIED or on a cloud-connected hub communicatively coupled to the BSIED). If the BSIED determines that at least a portion of the BSOD can be processed locally, the method proceeds to a block 950. Alternatively, if the BSIED determines that the BSOD cannot be processed locally (e.g., due to device constraints), the method may return to block 905 and the method may be repeated.

At block 950, the BSIED identifies portions of the BSOD that can be processed locally. Additionally, at block 955, the BSIED (or other local device) processes the identified portions of the BSOD. In embodiments, the identified portions of the BSOD may be processed to generate output data.

At block 960, subsequent to blocks 915, 920, 930, 940 or 955, the BSIED determines if there is more BSOD to be processed. If the BSIED determines that there is more BSOD to be processed, for example, due to certain portions of the BSOD needing to be processed remotely (e.g., on a CCCPU), the method returns to block 905. Alternatively, if the BSIED determines that there is no more BSOD to be processed, the method 900 may end. The method ending may, for example, be indicative of all of the BSOD having been processed. In embodiments, the method 900 may be repeated continuously, periodically, or in response to a control signal (e.g., a control signal as may be provided to the BSIED) depending on system and application requirements. For example, in embodiments the method 900 may repeat each time new BSOD is generated by the BSIED.

Figure 10:
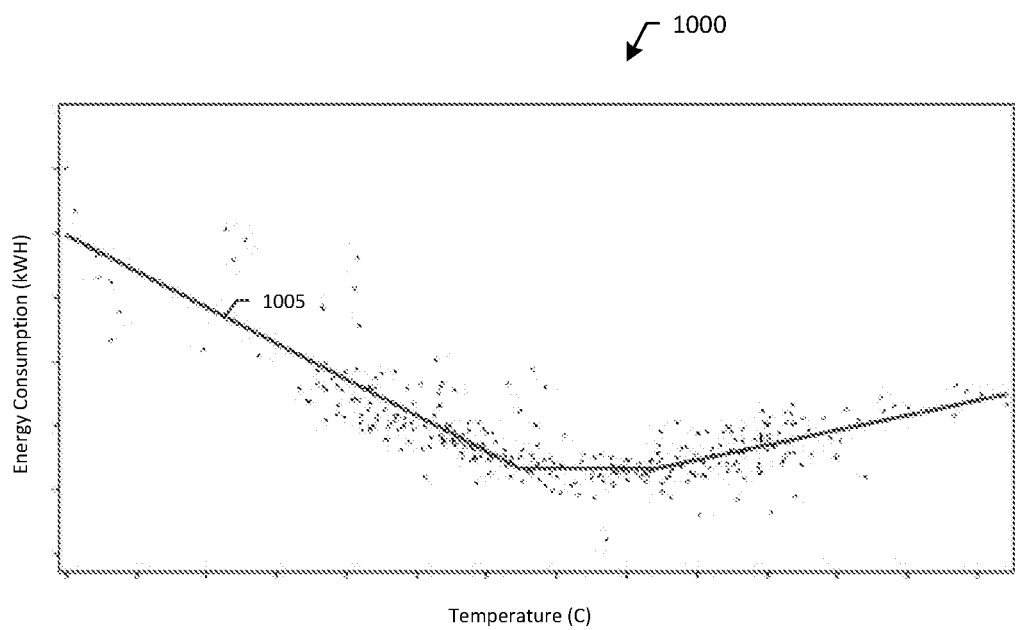
FIG. 10 is a plot showing example BSOD generated by a BSIED.

Referring to FIG. 10, a plot 1000 illustrates predicted energy consumption (e.g., daily energy consumption) for an example building (e.g., 102, shown in FIG. 1) in which a BSIED (e.g., 112, shown in FIG. 1) may be installed. The plot 1000 has a horizontal axis with a scale in temperature units (e.g., degrees Celsius (C)) and a vertical axis with a scale in energy consumption units (e.g., kilowatt hours (kWHs)). The horizontal axis may, for example, be illustrative of example temperatures (e.g., average outdoor temperatures) to which the building is exposed.

In embodiments, the BSIED may be responsive to temperature data received from one or more temperature sensors (e.g., 131, shown in FIG. 1) on the premises of the building, and/or from external data sources (e.g., 190, shown in FIG. 1), such as the United States National Weather Service, to estimate the building energy consumption over various temperatures, as shown by line 1005 in plot 1000. More particularly, the temperature data may be received as building signature input data at an input of the BSIED, and the BSIED, using the building signature input data as inputs to a BSOM associated with the BSIED, may generate building signature operational data (BSOD) indicative of the estimated building energy consumption (as shown by line 1005) at an output of the BSIED. In embodiments in which the temperature data corresponds to average temperature data, and the BSIED is responsive to temperature data received from temperature sensors on the premises of the building, the average outdoor temperature may, for example, be computed locally on the BSIED or remotely in the cloud (e.g., on a CCCPU). The average outdoor temperature may correspond to the average outdoor temperature at the building over a predetermined time period, for example, a day, a week or a month during a particular season of the year (e.g., fall or spring).

In embodiments, the temperature data is but one of many potential inputs that may be received as building signature input data at an input of the BSIED, and used by the BSOM of the BSIED to estimate building energy consumption. For example, as discussed in figures above, BSOMs used by BSIEDs to generate BSOD may account for a building's typical response to various environmental conditions (e.g., temperature, occupancy, and other drivers).

In some embodiments, the BSOM can be used to monitor for unexpected energy consumption in the building for which the BSOM was created. For example, when building energy consumption deviates significantly from historical behavior as captured in the BSOM, an alert or notification indicating the detected deviation may be generated. In some embodiments, the alert or notification may be generated by the BSIED and indicated in the form of a light emitting diode or other visual indicator of the BSIED. Additionally, in some embodiments the alert or notification may be generated by the BSIED and transmitted, for example, to a user device of facility management personnel in the building. The facility management personnel viewing the user device can, for example, respond to the alert by shutting down equipment (or adjusting parameters associated with equipment) (e.g., BE 122, shown in FIG. 1) in the building identified by the BSIED as causing the detected deviation.

In other embodiments, user interaction is not required for shutting down (or adjusting parameters associated with equipment). The BSIED can, for example, shut down equipment (or adjust parameters associated with equipment) in response to the detected deviation. In embodiments, the BSIED shuts down the equipment (or adjusts parameters associated with the equipment) by generating a control signal at an output of the BSIED in response to the detected deviation, and providing the control signal to a respective control input (or inputs) of the equipment. After shutting down the equipment (or adjusting parameters associated with the equipment), a notification can be sent to the user device of the facility management personnel indicating which equipment was shut down (or which parameters associated with the equipment were adjusted).

The detected deviations may also be stored in a memory device (e.g., a memory device of the BSIED) for later analysis in some embodiments. For example, the detected deviations may be analyzed for determining or validating equipment lifetime, or for determining a particular type of stress condition (e.g., over temperature condition) to which the equipment exposed. The particular type of stress condition may be determined (on the BSIED or externally), for example, by comparing monitored values of the detected deviations (e.g., a first deviation value, a second deviation value, etc.) over a predetermined time period, and associating the compared values with the stress condition type. In embodiments, the stress condition type may be reported through a display device or output signal (of the BSIED or externally), for example.

Figure 11:
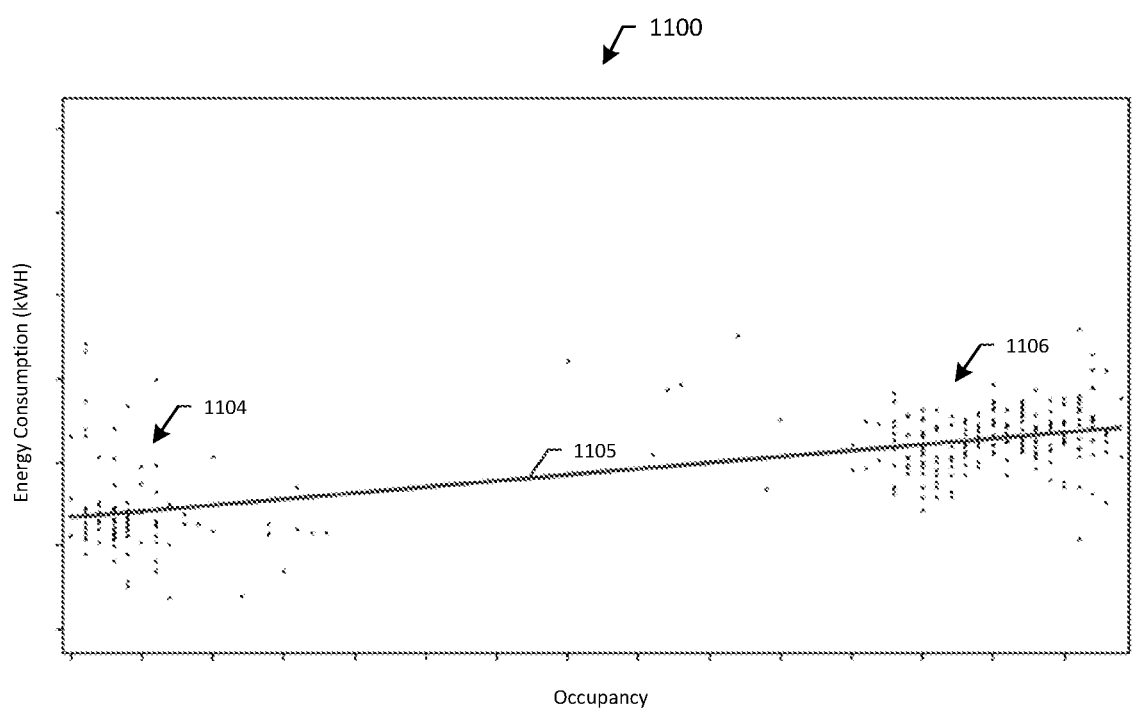
FIG. 11 is a plot showing further example BSOD generated by a BSIED.

Referring to FIG. 11, a plot 1100 illustrates predicted energy consumption (e.g., daily energy consumption) for an example building (e.g., 102, shown in FIG. 1) in which a BSIED (e.g., 112, shown in FIG. 1) may be installed. The plot 1100 has a horizontal axis with a scale in occupancy units and a vertical axis with a scale in energy consumption units (e.g., kilowatt hours (kWHs)). The horizontal axis may, for example, be illustrative of example numbers of people in the building.

In embodiments, the BSIED may be responsive to occupancy data received from one or more occupancy sensors (e.g., 131, shown in FIG. 1) on the premises of the building to estimate the building energy consumption over various building occupancy levels, as shown by line 1105 in plot 1100. More particularly, the occupancy data may be received as building signature input data at an input of the BSIED, and the BSIED, using the building signature input data as inputs to a BSOM associated with the BSIED, may generate BSOD indicative of the estimated building energy consumption (as shown by line 1105) at an output of the BSIED.

As illustrated, building energy consumption is affected by building occupancy. In embodiments, such occurs by virtue of additional demands placed on equipment (e.g., HVAC equipment) in the building in response to increased occupancy levels. The two sets of points shown in plot 1100 (as indicated by arrows 1104, 1106) represent an example unoccupied (or substantially unoccupied) state of the building (as indicated by arrow 1104) and an example occupied state of the building (as indicated by arrow 1106). In some embodiments, the variability shown between the two set of points is a result (sometimes, solely the result) of occupancy and random factors (the variability due to temperature has been removed and is represented in plot 1000 shown in FIG. 10). In embodiments, each point corresponds to one days worth of energy use. As illustrated, building energy consumption is greater (i.e., the cluster of points is higher) on days when the building is occupied (as indicated by arrow 1106) than on days when the building is unoccupied (or substantially unoccupied) (as indicated by arrow 1104).

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in particular applications. For example, while building signature intelligent electronic devices, building signature operational models, etc. are described herein, it is understood that embodiments of the disclosure are not limited to use in building signature applications. Rather, in embodiments the concepts, systems, circuits and techniques sought to be protected herein may adapted for use in substantially any other application in which the concepts, systems, circuits and techniques may be found suitable. For example, embodiments of the disclosure may be found suitable for use in demand response applications and energy storage applications (e.g., to optimize use of energy storage systems and associated components, such as batteries).

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method for evaluating a building signature operational model (BSOM) installed on a building signature intelligent electronic device (BSIED), the method comprising:
processing building signature operational data (BSOD) on a cloud-connected central processing unit to identify the BSIED from which the BSOD was received and to determine if the BSOM currently associated with the BSIED, and used by the BSIED to generate the BSOD, needs to be updated, wherein:
the BSOD is generated as a function of processing building signature input data (BSID) having building signature parameters by the BSOM when the BSOM is executed by the associated BSIED,
the BSIED performs one or more of monitoring and/or control functions to monitor and/or control the BSID, and
the BSOM is a high-level software application that is executed by a controller of the BSIED, using an operating system, such that operation of the BSIED is uninterrupted when the BSOM is updated;
in response to determining that the BSOM needs to be updated, selecting a new BSOM for the BSIED based, at least in part, on one or more characteristics associated with the BSIED; and
transmitting the new BSOM to the BSIED for installation on the BSIED.

2. The method of claim 1 further comprising validating that the new BSOM was correctly transmitted to the BSIED.

3. The method of claim 1 further comprising evaluating accuracy of the BSOD to confirm that the new BSOM is operating as expected.

4. The method of claim 3 wherein the BSID is received from one or more building signature data sources (BSDSs).

5. The method of claim 4 wherein the BSDSs comprise equipment to which the BSIED is coupled, and the BSID comprises energy usage information associated with the BSDSs.

6. The method of claim 3 wherein the BSID corresponds to test BSID for validating accuracy of the BSOM.

7. The method of claim 1 wherein processing BSOD on the cloud-connected central processing unit to identify the BSIED from which the BSOD was received from, and to determine if the BSOM currently associated with the BSIED needs to be updated, comprises:
determining if a predetermined time period or other predetermined condition has occurred since the BSOM has last been updated or verified;
in response to determining that the predetermined time period or other predetermined condition has occurred, submitting a request signal to the BSIED for retrieving BSOD from the BSIED;
transmitting BSOD from the BSIED to the cloud-connected central processing unit; and
processing the BSOD on the cloud-connected central processing unit to identify the BSIED from which the BSOD was received from, and to determine if the BSOM currently associated with the BSIED needs to be updated.

8. The method of claim 1 wherein processing BSOD on a cloud-connected central processing unit to determine if the BSOM currently associated with the BSIED needs to be updated comprises: comparing a version number of an algorithm used to generate the BSOM with a version number of a latest model generating algorithm, and determining that the BSOM needs to be updated if the version number of the algorithm used to generate the BSOM is substantially different from the version number of the latest model generating algorithm.

9. The method of claim 1 wherein selecting a new BSOM for the BSIED comprises generating a new BSOM for the BSIED based, at least in part, on the BSOD and one or more characteristics associated with the BSIED.

10. The method of claim 1 wherein selecting a new BSOM for the BSIED comprises:
selecting a closest BSOM for the BSIED from a BSOM library based, at least in part, on one or more characteristics associated with the BSIED;
determining if the closest BSOM needs to be translated or otherwise modified to work with the BSIED;
in response to determining that the closest BSOM needs to be translated or otherwise modified to work with the BSIED, translating the closest BSOM into a form the BSIED supports; and
selecting the translated BSOM as the new BSOM for the BSIED.

11. The method of claim 10 wherein the BSOM library is stored on a memory device associated with the cloud-connected central processing unit, and wherein the BSOM library comprises a plurality of BSOMs.

12. The method of claim 11 wherein the plurality of BSOMs are generated by the cloud-connected central processing unit in response to receiving input data from one or more respective data sources associated with the BSIEDs for which the plurality of BSOMs are intended.

13. The method of claim 12 wherein the data sources include at least one of a temperature sensor, a humidity sensor, and an occupancy sensor configured to generate respective temperature, humidity and occupancy input data pertaining to the environment(s) in which the BSIEDs are installed.

14. The method of claim 1 wherein the characteristics associated with the BSIED include BSIED type, BSIED complexity, and building signature parameters monitored by the BSIED.

15. The method of claim 14 wherein the BSIED type includes at least one of an energy meter, a power quality monitor, a waveform monitor, a programmable sensing device, an uninterruptible power supply, a power quality correction device, and a harmonic filter with metering capabilities.

16. The method of claim 14, wherein the building signature parameters include one or more energy consumption parameters.

17. The method of claim 1, wherein the BSOD is indicative of an estimated energy consumption of a building in which the BSIED is installed.

18. The method of claim 14 wherein the BSIED complexity is selected from "basic", "intermediate", and "advanced", wherein an intermediate complexity BSIED has more functionality than a basic complexity BSIED, and an advanced complexity BSIED has more functionality than the intermediate complexity BSIED.

19. The method of claim 18 wherein the intermediate complexity BSIED is responsive to more building signature data sources than the basic complexity BSIED, and the advanced complexity BSIED is responsive to more building signature data sources than the intermediate complexity BSIED.

20. The method of claim 1 further comprising:
subsequent to selecting the new BSOM for the BSIED, determining if the BSOM is capable of being updated to the new BSOM;

in response to determining that the BSOM is capable of being updated to the new BSOM, identifying parameters to be added to, removed from and/or modified in the current BSOM to update the BSOM to the new BSOM; and updating the BSOM to the new BSOM based on the identified parameters.

21. The method of claim 20 wherein updating the current BSOM to the new BSOM comprises generating the parameters identified to be added to and/or modified in the BSOM, and wherein transmitting the new BSOM to the BSIED comprises: (a) transmitting the generated parameters to the BSIED, (b) providing an indication of which parameters, if any, should be removed from the BSOM to the BSIED, and (c) updating the BSOM to the new BSOM on the BSIED based on the generated parameters and the provided indication.

22. The method of claim 1 further comprising tuning the new BSOM in response to user input.

23. The method of claim 22 wherein the new BSOM is tuned on the BSIED.

24. The method of claim 22 wherein the new BSOM is tuned on the cloud-connected central processing unit.

25. A building signature system, comprising:

at least one building signature intelligent electronic device (BSIED) comprising a memory device and a processor coupled to the memory device, the processor and the memory device configured to:

receive building signature input data (BSID) having building signature parameters from one or more building signature data sources (BSDSs);

perform one or more of monitoring and/or control functions to monitor and/or control the BSID;

process the received BSID using a current building signature operational model (BSOM) stored on the memory device to generate building signature operational data (BSOD), wherein the BSOM is a high-level software application that is executed by a controller of the BSIED, using an operating system, such that operation of the BSIED is uninterrupted when the BSOM is updated, and transmit the BSOD to a cloud-connected central processing unit communicatively coupled to the at least one BSIED;

the cloud-connected central processing unit configured to:

process the BSOD to identify the at least one BSIED from which the BSOD was received, and to determine if the BSOM currently associated with the at least one BSIED needs to be updated;

in response to determining that the current BSOM needs to be updated, select a new BSOM for the at least one BSIED based, at least in part, on one or more characteristics associated with the at least one BSIED; and transmit the new BSOM to the at least one BSIED for installation on the at least one BSIED.

26. The building signature system of claim 25, wherein the BSDSs comprise equipment to which the at least one BSIED is coupled, and the BSID comprises energy usage information associated with the BSDSs.

27. The building signature system of claim 25, wherein the BSOD is indicative of an estimated energy consumption of a building in which the at least one BSIED is installed.

* * * * *